(12) United States Patent
Mishima

(10) Patent No.: US 9,045,008 B2
(45) Date of Patent: Jun. 2, 2015

(54) TIRE

(75) Inventor: Sayaka Mishima, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 105 days.

(21) Appl. No.: 13/814,044

(22) PCT Filed: Aug. 5, 2011

(86) PCT No.: PCT/JP2011/067993
§ 371 (c)(1),
(2), (4) Date: Mar. 8, 2013

(87) PCT Pub. No.: WO2012/018128
PCT Pub. Date: Feb. 9, 2012

(65) Prior Publication Data
US 2013/0168002 A1  Jul. 4, 2013

(30) Foreign Application Priority Data

Aug. 5, 2010 (JP) ................................. 2010-176494

(51) Int. Cl.
*B60C 13/02* (2006.01)

(52) U.S. Cl.
CPC ............. *B60C 13/02* (2013.01); *B60C 2200/06* (2013.04)

(58) Field of Classification Search
CPC ........ B60C 13/00; B60C 13/02; B60C 13/023
USPC ............ 152/523–525, 153, 454, 544, 209.11; D12/506, 534, 569, 605
See application file for complete search history.

(56) References Cited

U.S. PATENT DOCUMENTS

| 693,661 | A | * | 2/1902 | Lober | ........................... 152/453 |
|---|---|---|---|---|---|
| D207,570 | S | * | 5/1967 | Ueno | ........................... D12/605 |
| D207,572 | S | * | 5/1967 | Ueno | ........................... D12/605 |
| D211,148 | S | * | 5/1968 | Ueno | ........................... D12/605 |
| D231,214 | S | * | 4/1974 | Hart | ............................. D12/605 |
| 2010/0193101 | A1 | | 8/2010 | Miyasaka et al. | |
| 2010/0294412 | A1 | * | 11/2010 | Inoue et al. | ................... 152/523 |

(Continued)

FOREIGN PATENT DOCUMENTS

| EP | 0 481 687 A1 | | 4/1992 |
|---|---|---|---|
| JP | 2006-290240 | * | 10/2006 |
| JP | A-2008-222007 | | 9/2008 |

(Continued)

OTHER PUBLICATIONS

Nov. 15, 2011 International Search Report issued in International Patent Application No. PCT/JP2011/067993 (with translation).

(Continued)

*Primary Examiner* — Eric Hug
(74) *Attorney, Agent, or Firm* — Oliff PLC

(57) ABSTRACT

Circumferential recesses have: first blocks protruding outward in the tire tread width direction, the first blocks having radial outer end sections and radial inner front end sections; and second blocks protruding outward in the tire tread width direction, the second blocks having radial inner end sections and radial outer front end sections. The radial inner front end sections of the first blocks and the radial outer front end sections of the second blocks are separated from each other in the tire circumferential direction or in the tire radial direction.

12 Claims, 16 Drawing Sheets

(56) References Cited

U.S. PATENT DOCUMENTS

2011/0041971 A1* 2/2011 Kuroishi ................ 152/153
2011/0094646 A1* 4/2011 Watanabe ................ 152/523

FOREIGN PATENT DOCUMENTS

| JP | A-2009-29383 | | 2/2009 |
| JP | A-2009-29384 | | 2/2009 |
| JP | WO 2009/084634 A1 | | 7/2009 |
| JP | A-2010-95150 | | 4/2010 |
| WO | WO 2009/084633 | * | 7/2009 |
| WO | WO 2009/084634 | * | 7/2009 |
| WO | WO 2009/133892 | * | 11/2009 |

OTHER PUBLICATIONS

Jul. 17, 2014 European Search Report issued in EP Application No. 11814753.7.

* cited by examiner

FIG. 4
(a)
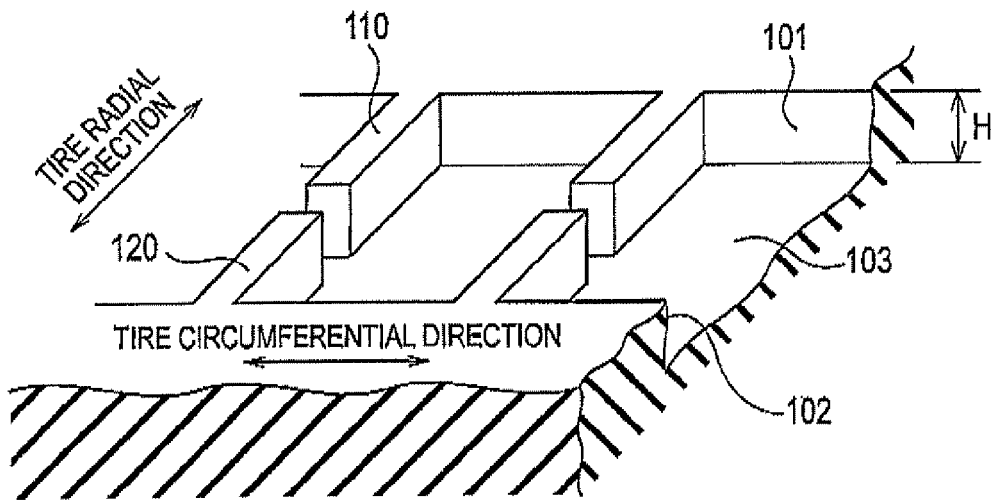
(b)
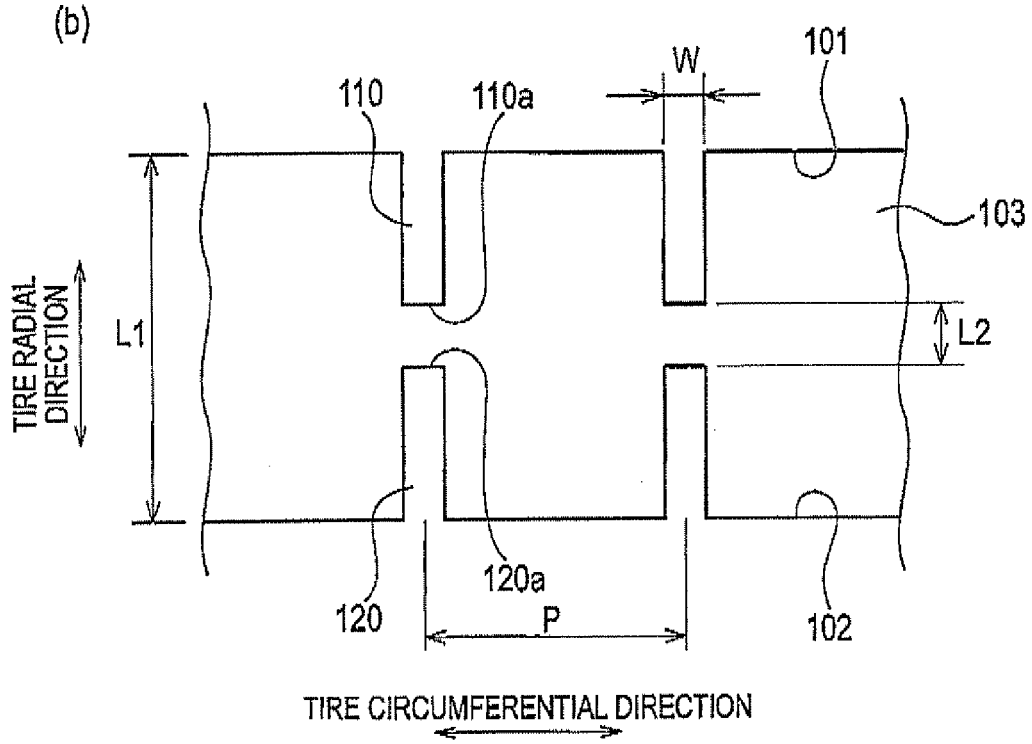

FIG. 5
(a)
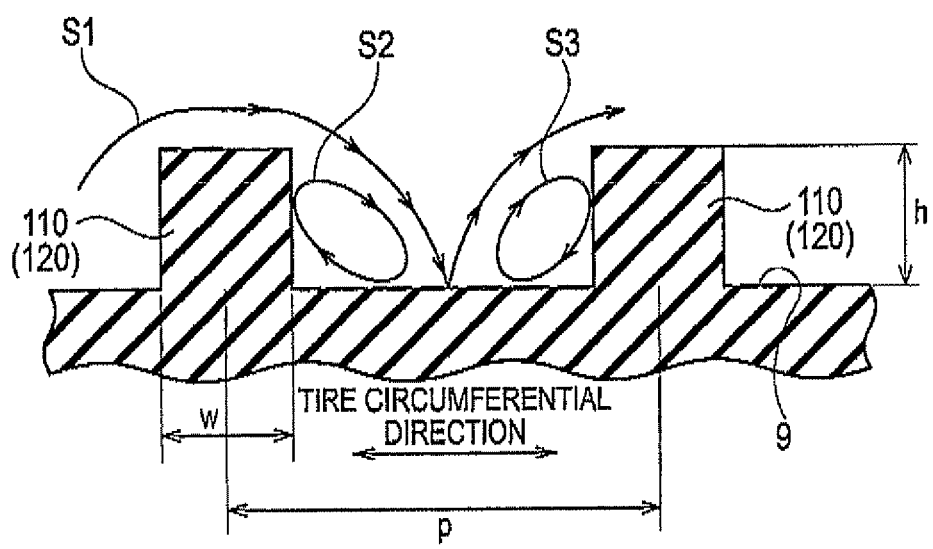
(b)
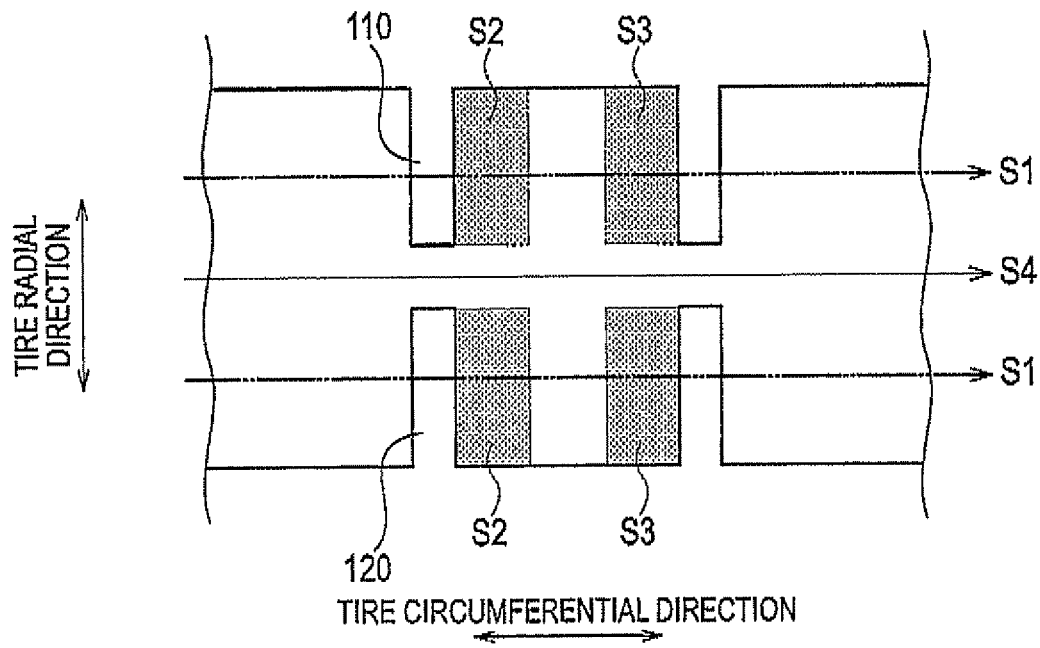

FIG. 6
(a)
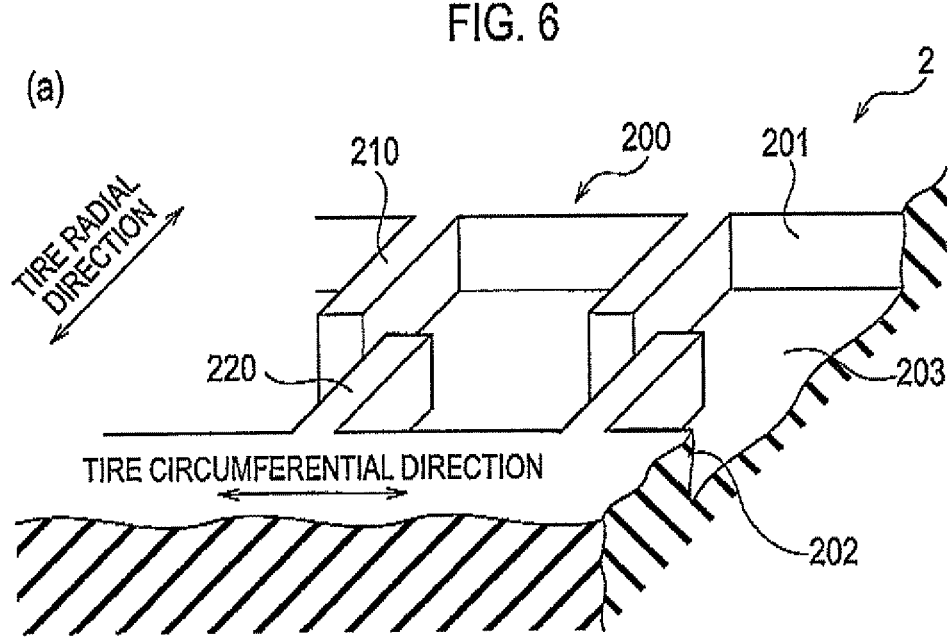
(b)
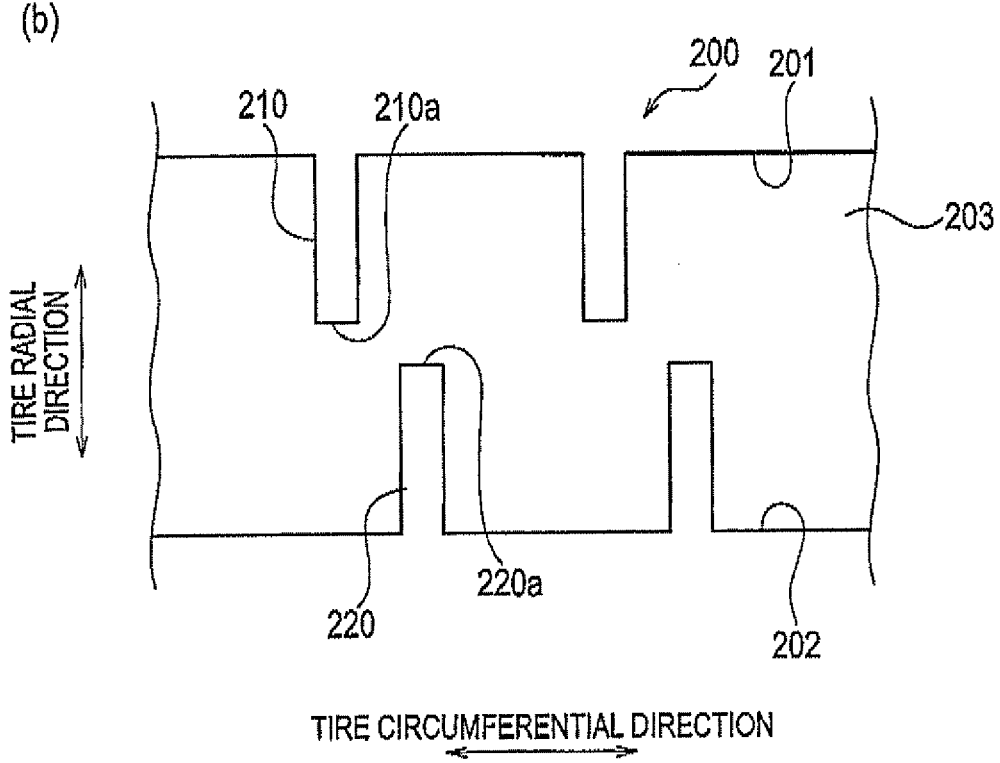

FIG. 7
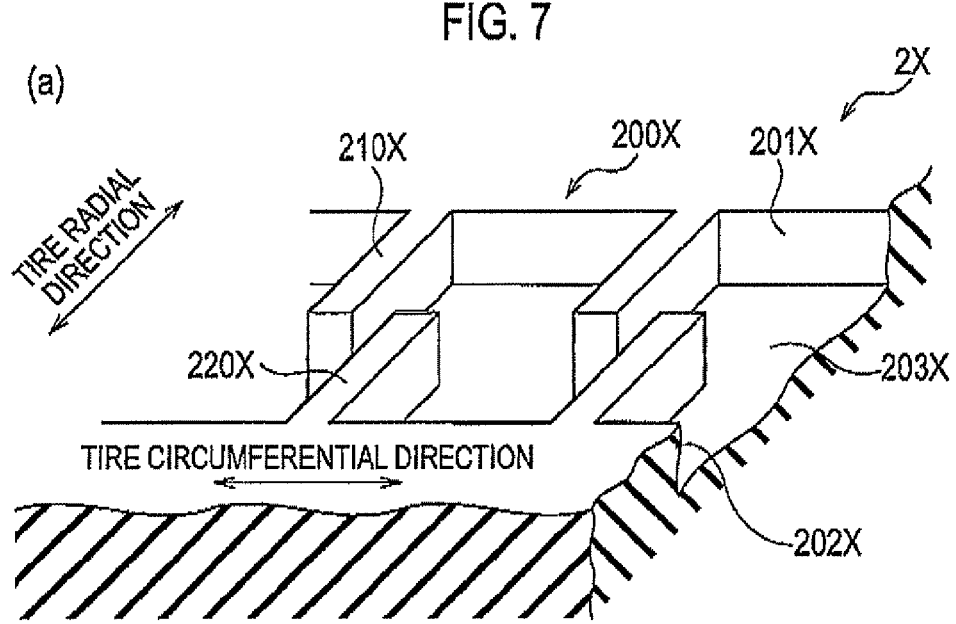
(a)
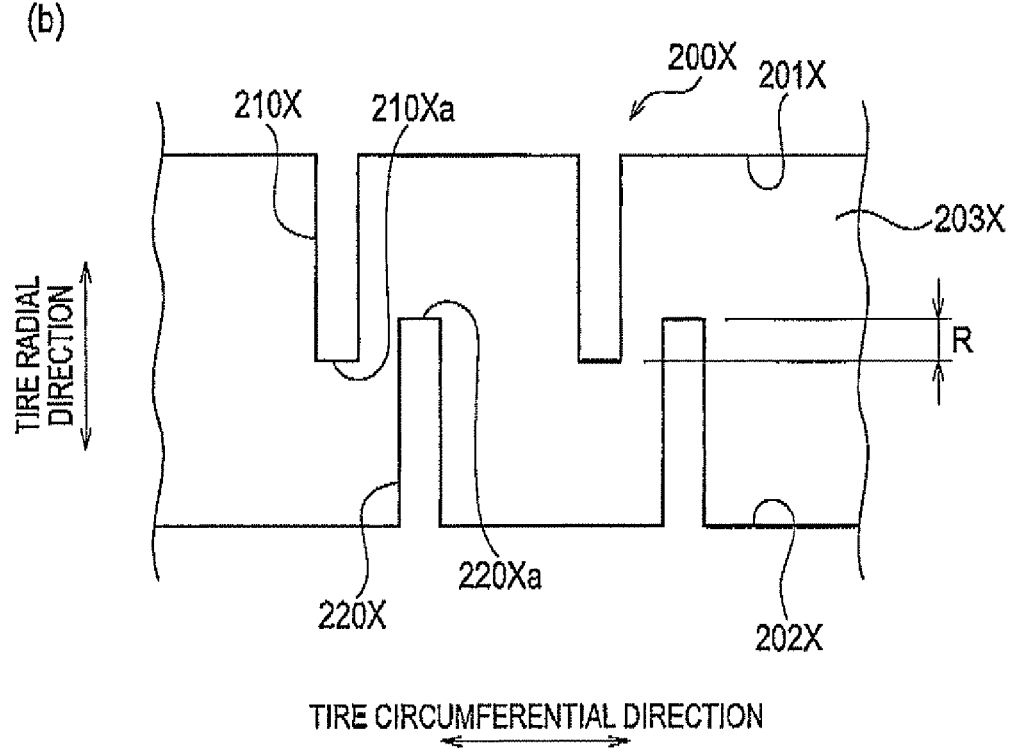
(b)

FIG. 8
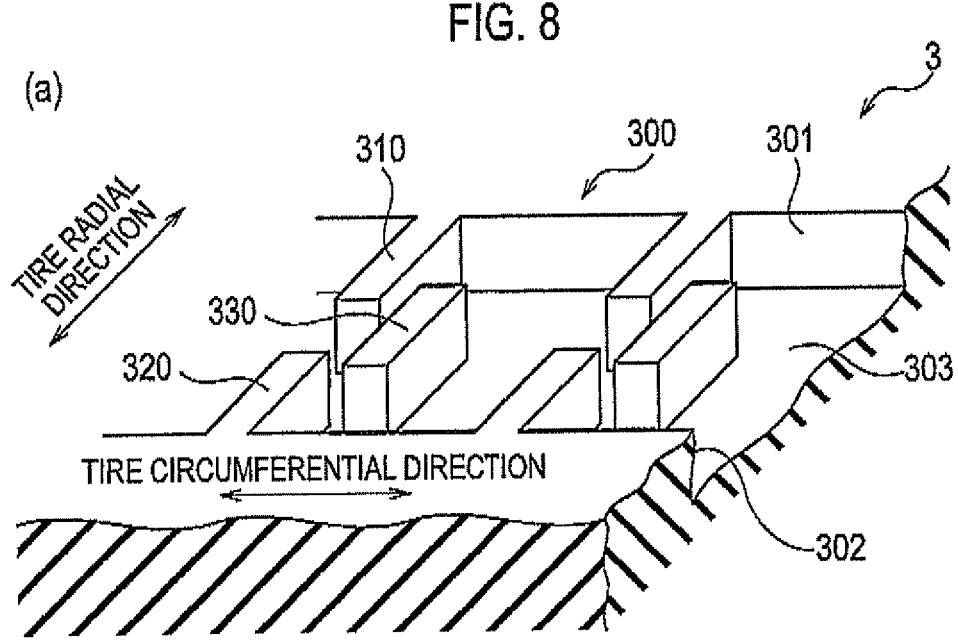
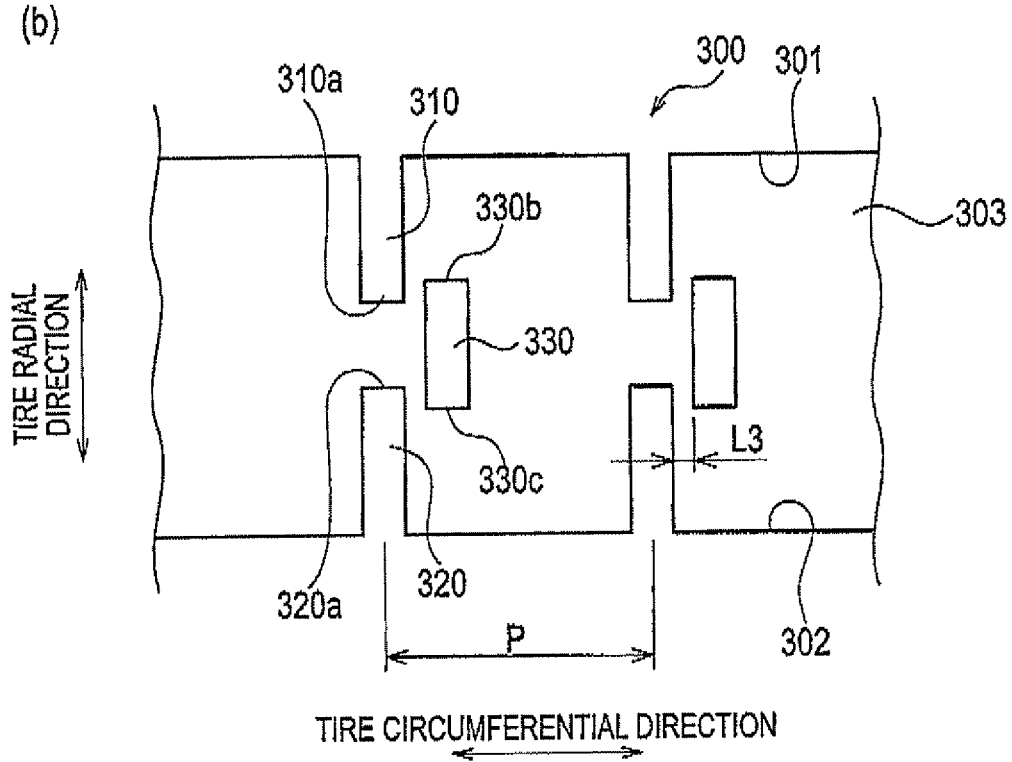

FIG. 10
(a)
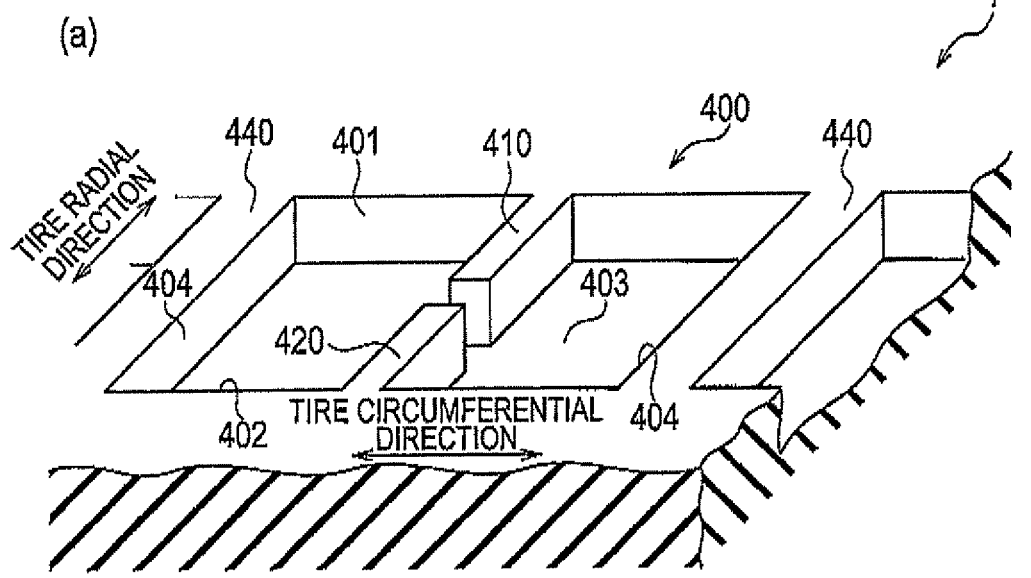
(b)
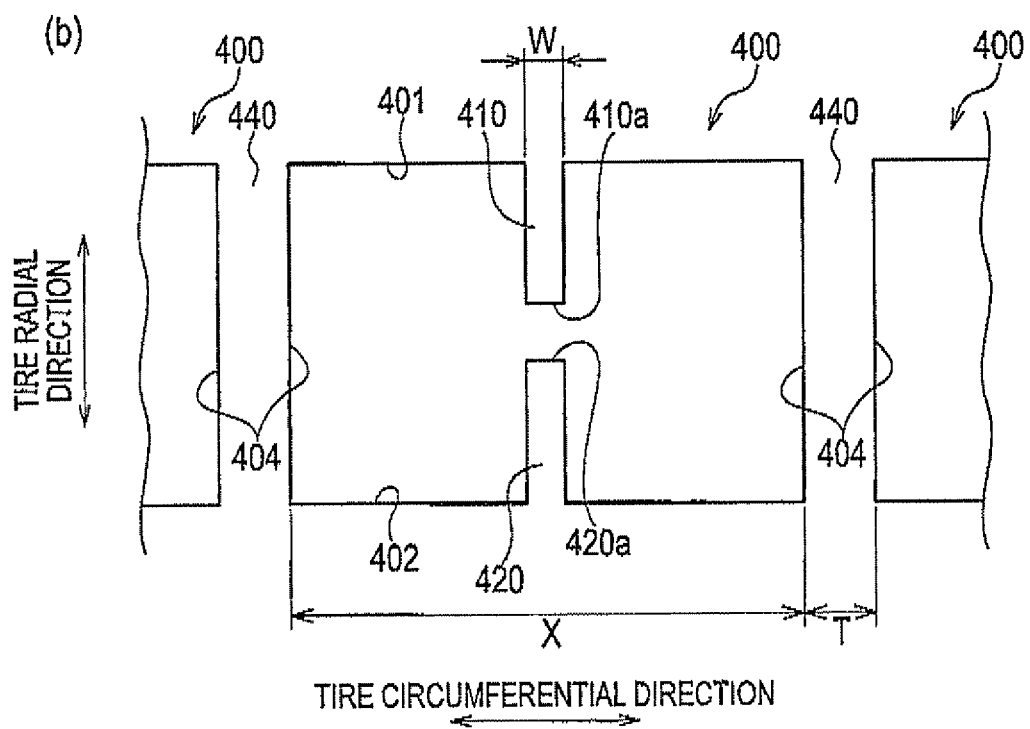

FIG. 12
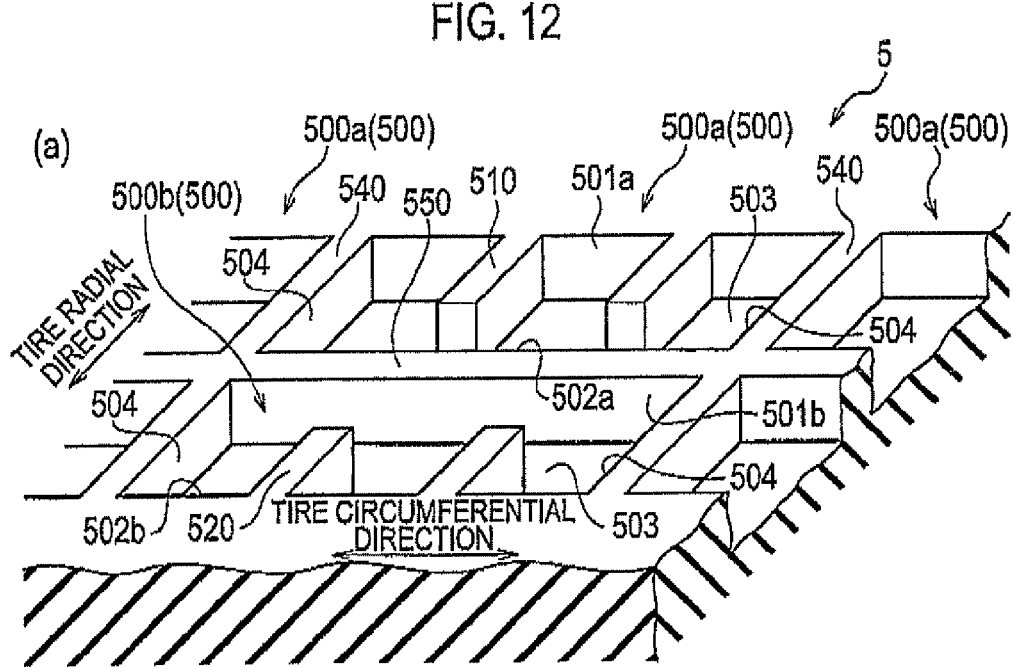
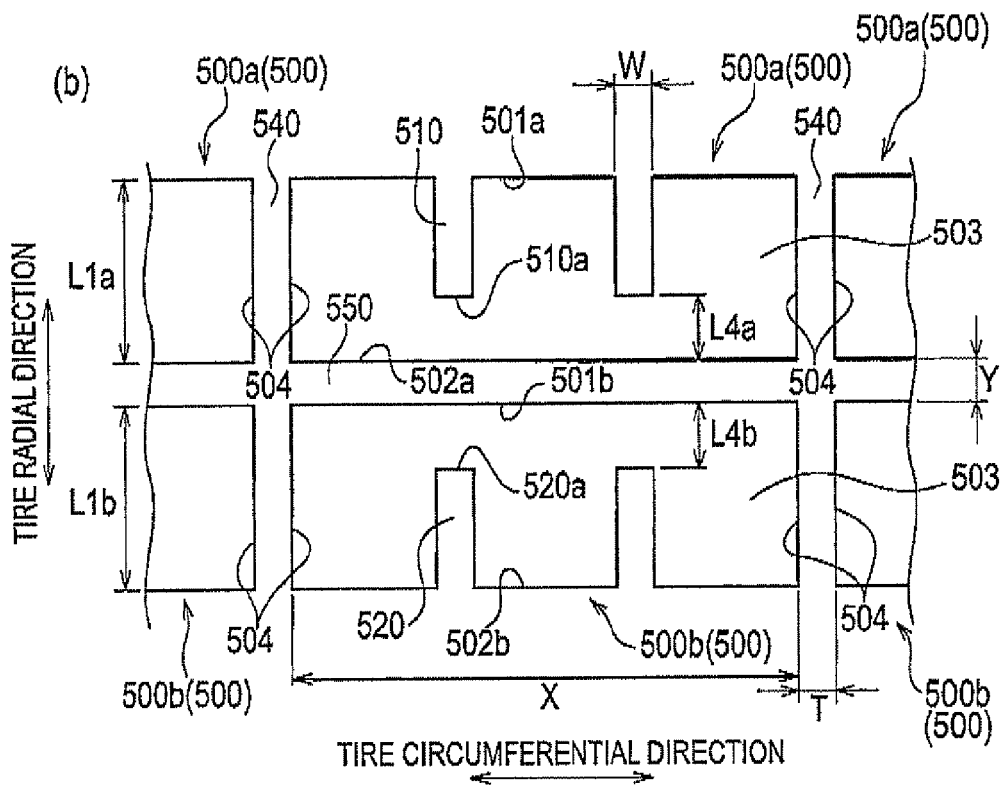

TIRE

TECHNICAL FIELD

The present invention relates to a tire that suppresses an increase in the temperature of rubber of a tire side portion, particularly, a bead unit while reducing the manufacturing cost.

BACKGROUND ART

Conventionally, in a tire mounted in a vehicle, heat generation when the tire is rolling is problematic. An increase in the temperature of the tire due to the heat generation promotes deterioration with age such as deterioration in the physical property of the tire material, and causes the breakage and the like of a tread when the vehicle travels at a high speed. Particularly, in an off-the-road radial (ORR) tire and a truck bus radial (TBR) tire to be used with a heavy load, rubber of a bead unit is deformed by friction with a rim flange and pressure from the rim flange, so that heat is easily generated. Since the heat generation in the bead unit may promote the deterioration of the rubber of the bead unit, and reduce the endurance of the tire as well as the endurance of the bead unit, a tire capable of reducing the temperature of the bead unit is required.

For example, in a tire disclosed in Patent Literature 1, as a means for reducing the temperature of the bead unit, a turbulence generating protrusion is formed along the tire radial direction over the range from a side unit to the bead unit. Accordingly, turbulence with high flow velocity is generated on the tire surface and heat dissipation in the bead unit is promoted, so that an increase in the temperature of the bead unit is suppressed.

CITATION LIST

Patent Literature

[PTL 1] International Publication No. WO2009/084634

SUMMARY OF INVENTION

However, the aforementioned conventional tire has the following problems. That is, a method for forming the protrusion at the beat unit increases the volume of the rubber of the bead unit and thus increases a deformation amount of the rubber when the tire is rolling, so that heat is easily generated. In this case, an effect of promoting heat dissipation by forming the protrusion and thus suppressing an increase in the temperature of the bead unit is reduced. Furthermore, since the rubber is necessary for forming the protrusion, the amount of rubber necessary for the pneumatic tire is increased, so that the manufacturing cost is increased. From these reasons, a tire for suppressing an increase in the temperature of the bead unit needs to be further improved.

Therefore, the present invention has been achieved in view of the above-described problems, and an object thereof is to provide a tire that suppresses an increase in the temperature of rubber of a tire side portion, particularly, a bead unit while reducing the manufacturing cost.

A feature of the present invention is summarized as a tire (pneumatic tire 1) having a circumferential recessed portion (circumferential recessed portion 100) formed at an outer surface of a tire side portion (tire side portion 20), the circumferential recessed portion being recessed inward in a tread width direction and extends in a tire circumferential direction, wherein the circumferential recessed portioned portion is provided with: a first block (first block 110) having a radial direction-outer end portion positioned at an outer side in a tire radial direction from a center in the tire radial direction in the circumferential recessed portion, and a radial direction-inner front end portion (inner front end portion 110a) positioned at an inner side in the tire radial direction from the radial direction-outer end portion, and is protruded outward in the tread width direction; and a second block (second block 120) having a radial direction-inner end portion positioned at the inner side in the tire radial direction from the center in the tire radial direction in the circumferential recessed portion, and a radial direction-outer front end portion (outer front end portion 120a) positioned at the outer side in the tire radial direction from the radial direction-inner end portion, and is protruded outward in the tread width direction, and the radial direction-inner front end portion of the first block, and the radial direction-outer front end portion of the second block are separated in the tire circumferential direction or the tire radial direction.

Accordingly, as the pneumatic tire rotates, turbulence is generated in a circumferential recessed portion. Specifically, the air flowing through the outer surface of the tire side portion enters the circumferential recessed portion, and the air having entered the circumferential recessed portion flows while climbing over the first block and the second block. At this time, by the flow of the air repeatedly attached and separated to/from the circumferential recessed portion, heat of the bead unit is taken away. That is, heat dissipation is promoted from the circumferential recessed portion, so that it is possible to suppress an increase in the temperature of the bead unit. As a consequence, it is possible to suppress the deterioration of the tire due to an increase in the temperature of the bead unit, thereby improving the endurance of the pneumatic tire.

Moreover, since a first block and a second block formed in the circumferential recessed portion are separated from each other, the flow of the air is generated between the first block and the second block. Accordingly, the air having entered the circumferential recessed portion easily leads to turbulence by the flow of the air flowing while climbing over the first block and the second block and the flow of the air flowing between the first block and the second block. Thus, heat dissipation of the bead unit is promoted from the circumferential recessed portion, so that it is possible to suppress an increase in the temperature of the bead unit due to the rotation of the pneumatic tire.

Furthermore, the pneumatic tire is formed with the circumferential recessed portion, so that it is possible to reduce the volume of rubber of the bead unit as compared with the case in which the circumferential recessed portion is not formed. That is, in the bead unit, the amount of rubber deformed by the rotation of the pneumatic tire is reduced. Consequently, it is possible to suppress heat generation due to the deformation of the rubber of the bead unit. Moreover, it is possible to reduce the amount of rubber for manufacturing the pneumatic tire, thereby suppressing the manufacturing cost of the pneumatic tire.

Another feature of the present invention is summarized as that the first block protrudes inward in the tire radial direction from the tire radial direction-outer end portion in the circumferential recessed portion, and the second block protrudes outward in the tire radial direction from the tire radial direction-inner end portion in the circumferential recessed portion.

Another feature of the present invention is summarized as that the first block and the second block are formed in a straight line in the tire radial direction.

Another feature of the present invention is summarized as that the first block and the second block are formed to be alternately in the tire circumferential direction.

Another feature of the present invention is summarized as that the circumferential recessed portion is provided with: a third block (third block 330) that is separated from a tire radial direction-both end portions of the circumferential recessed portion, separated from the first block and the second block in the tire circumferential direction, and protrudes outward in the tread width direction from an inner side in the tread width direction of the circumferential recessed portion.

Another feature of the present invention is summarized as that the third block has: an outer end portion positioned at the outer side in the tire radial direction; and an inner end portion positioned at the inner side in the tire radial direction, the outer end portion is positioned at the outer side in the tire radial direction from the radial direction-inner front end portion of the first block, and the inner end portion is positioned at the inner side in the tire radial direction from the radial direction-outer front end portion of the second block.

Another feature of the present invention is summarized as that the circumferential recessed portion is formed, in a section along the tread width direction and the tire radial direction, at a position from a tire maximum width portion to an upper end portion of a rim flange.

Another feature of the present invention is summarized as that the depth in the tread width direction of the circumferential recessed portion is in a range of 10 mm to 25 mm.

Another feature of the present invention is summarized as that the length in the tire radial direction of the circumferential recessed portion is in a range of 100 mm to 150 mm.

Another feature of the present invention is summarized as that the widths in the tire circumferential direction of the first block, the second block, and the third block are in a range of 2 mm to 10 mm.

Another feature of the present invention is summarized as that a distance along the tire radial direction between the radial direction-inner front end portion of the first block and the radial direction-outer front end portion of the second block is in a range of 15% to 30% with respect to a pitch in the tire circumferential direction of the first block and the second block.

Another feature of the present invention is summarized as that when the depth in the tread width direction of the circumferential recessed portion is defined as H, a pitch in the tire circumferential direction of the first and second blocks is defined as P, and the widths in the tire circumferential direction of the first and second blocks are defined as W, a relation of $1.0 \leq P/H \leq 50.0$ and $1.0 \leq (P-W)/W \leq 100.0$ is satisfied.

Another feature of the present invention is summarized as that in a section along the tread width direction and the tire radial direction, the radial direction-inner front end portion of the first block is inclined with respect to a bottom surface of the circumferential recessed portion, an angle formed by the radial direction-inner front end portion of the first block and the bottom surface is an obtuse angle, the radial direction-outer front end portion of the second block is inclined with respect to the bottom surface, and an angle formed by the radial direction-outer front end portion of the second block and the bottom surface is an obtuse angle.

BRIEF DESCRIPTION OF DRAWINGS

FIG. 4(a) is a partially enlarged perspective view of a circumferential recessed portion 100 according to the first embodiment. FIG. 4(b) is a partially enlarged plan view of the circumferential recessed portion 100 according to the first embodiment.

FIG. 5(a) is a diagram for explaining a state of turbulence generation and is a partially enlarged sectional view in the tread width direction of the circumferential recessed portion 100. FIG. 5(b) is a diagram for explaining the state of the turbulence generation and is a partially enlarged plan view of the circumferential recessed portion 100.

FIG. 6(a) is a partially enlarged perspective view of a circumferential recessed portion 200 according to a second embodiment. FIG. 6(b) is a partially enlarged plan view of the circumferential recessed portion 200 according to the second embodiment.

FIG. 7(a) is a partially enlarged perspective view of a circumferential recessed portion 200X according to a modification of the second embodiment. FIG. 7(b) is a partially enlarged plan view of the circumferential recessed portion 200X according to the modification of the second embodiment.

FIG. 8(a) is a partially enlarged perspective view of a circumferential recessed portion 300 according to a third embodiment. FIG. 8(b) is a partially enlarged plan view of the circumferential recessed portion 300 according to the third embodiment.

FIG. 10(a) is a partially enlarged perspective view of a circumferential recessed portion 400 according to the fourth embodiment. FIG. 10(b) is a partially enlarged plan view of the circumferential recessed portion 400 according to the fourth embodiment.

FIG. 12(a) is a partially enlarged perspective view of a circumferential recessed portion 500 according to the fifth embodiment. FIG. 12(b) is a partially enlarged plan view of the circumferential recessed portion 500 according to the fifth embodiment.

DESCRIPTION OF EMBODIMENTS

Figure 1:
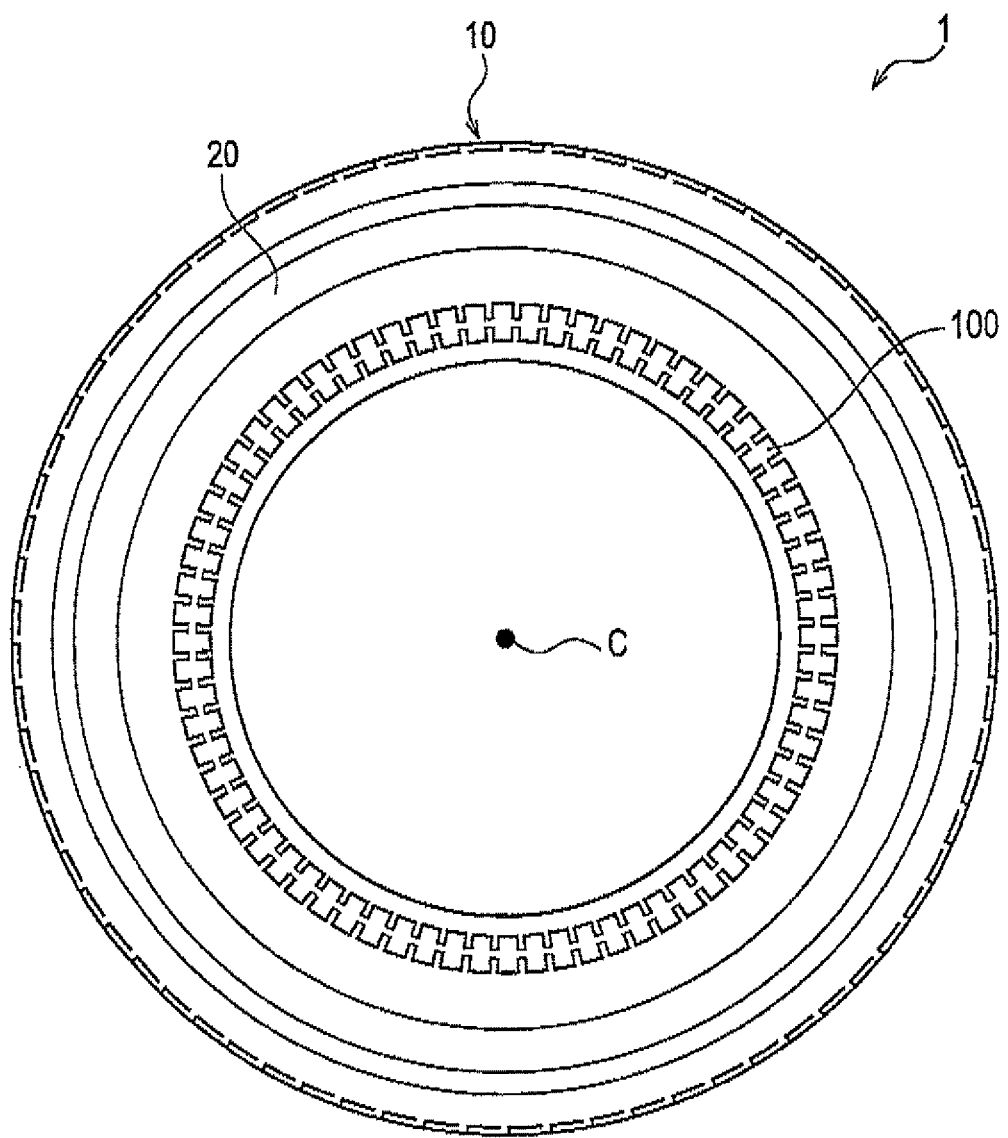
FIG. 1 is a diagram seen from a side wall surface at a tire side portion 20 side in a pneumatic tire 1 according to a first embodiment of the present invention.

Next, a first embodiment, a second embodiment, a third embodiment, a fourth embodiment, a fifth embodiment, comparative evaluations, and other embodiments according to the present invention will be described with reference to the drawings.

In the following description of the drawings, the same or similar reference numerals are used to designate the same or similar parts. It will be appreciated that the drawings are schematically shown and the ratio and the like of each dimension are different from the real ones.

Therefore, a specific dimension should be determined in view of the following description. Moreover, among the drawings, the respective dimensional relations or ratios may differ.

(1) First Embodiment

In the first embodiment, (1.1) Configuration of pneumatic tire 1, (1.2) Configuration of circumferential recessed portion 100, (1.3) State of turbulence generation, and (1.4) Operation and effect will be described.

(1.1) Configuration of Pneumatic Tire 1

Figure 2:
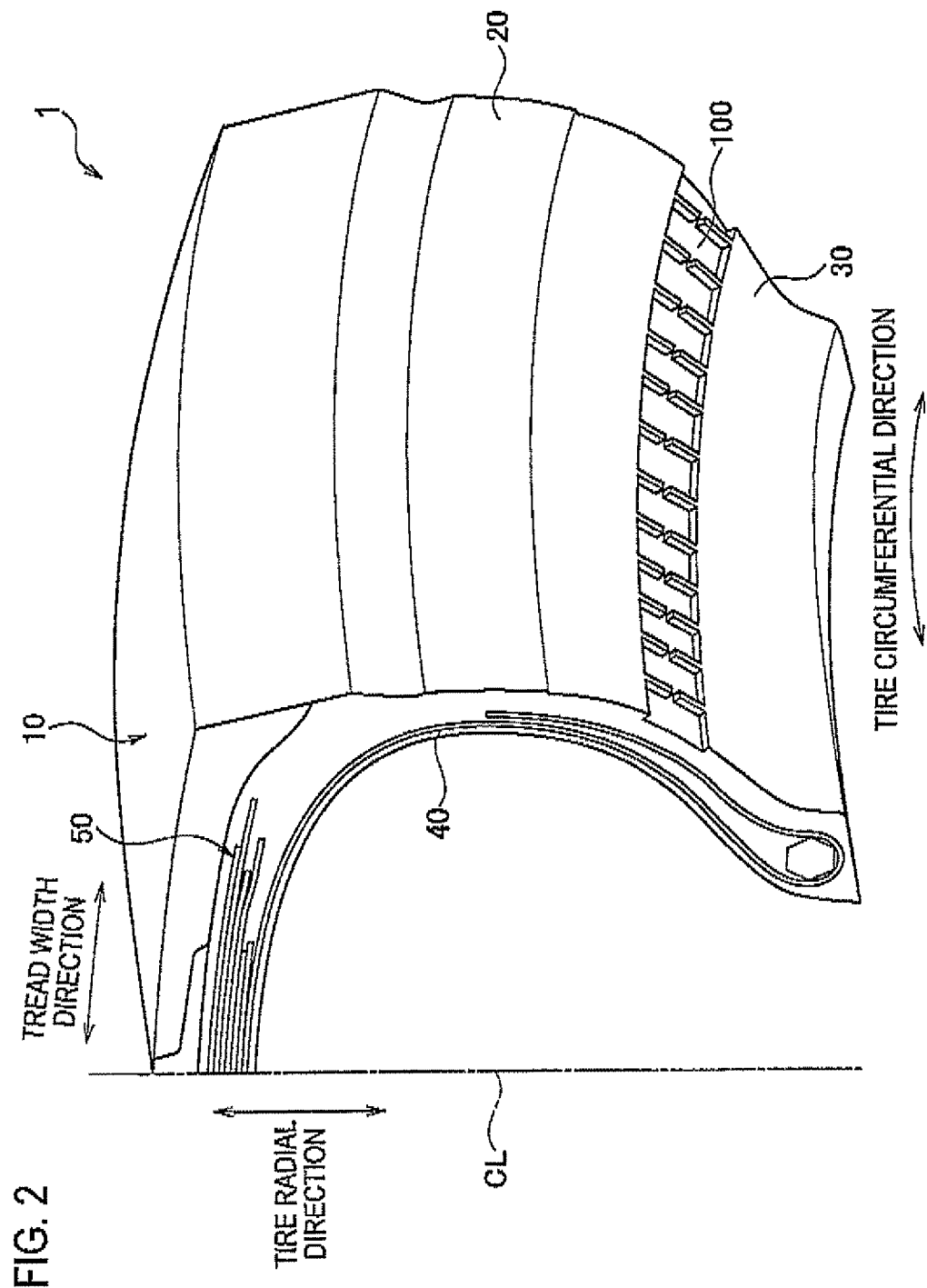
FIG. 2 is a partially exploded perspective view illustrating the pneumatic tire 1 according to the first embodiment of the present invention.
Figure 3:
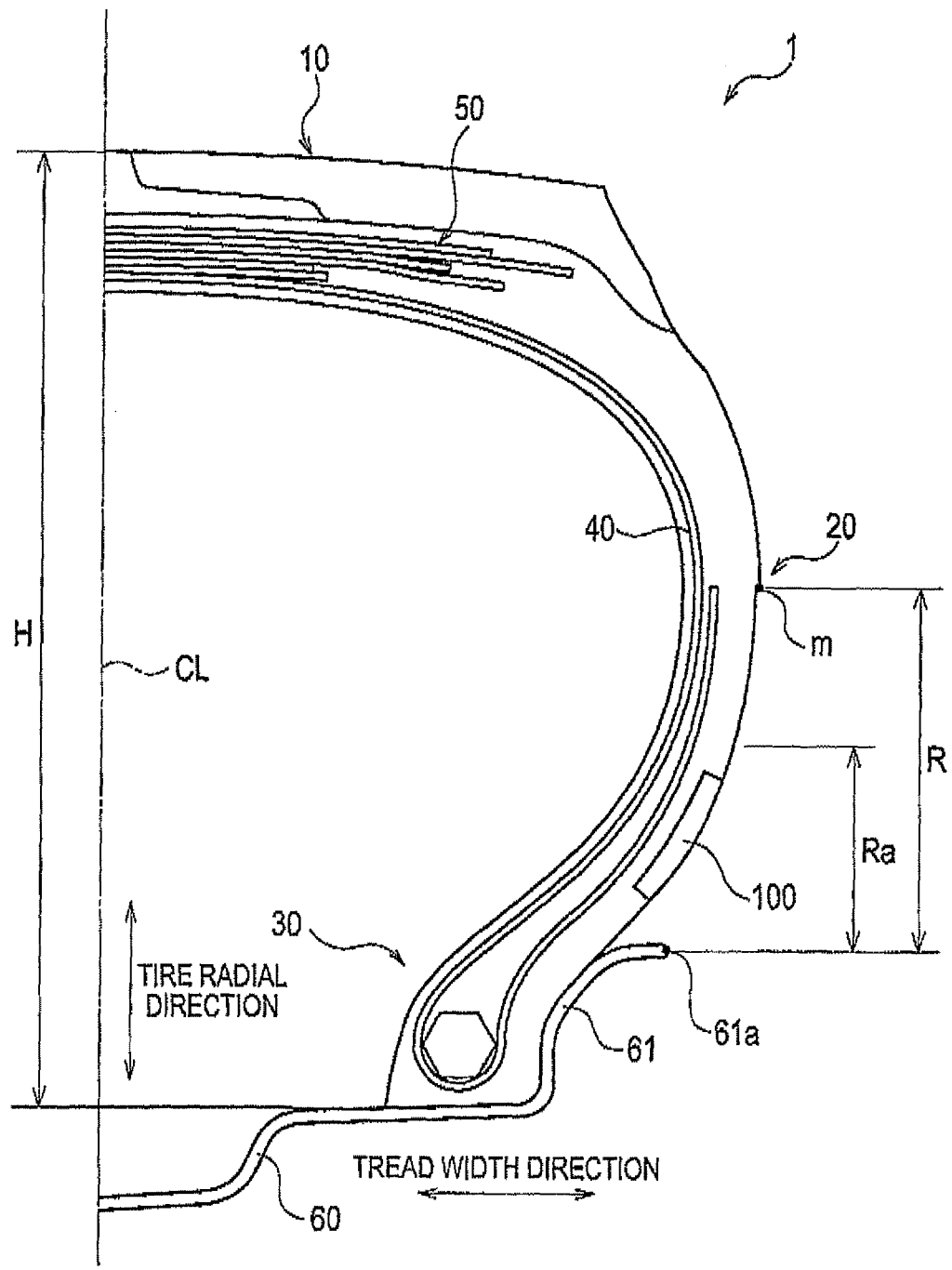
FIG. 3 is a sectional view illustrating the pneumatic tire 1 according to the first embodiment of the present invention.

A pneumatic tire 1 according to the present embodiment is a pneumatic tire for a heavy load, which is mounted in a construction vehicle such as a dump truck. The configuration of the pneumatic tire 1 will be described with reference to the drawings. FIG. 1 is a diagram seen from a side wall surface at a tire side portion 20 side in the pneumatic tire 1 according to the first embodiment of the present invention. FIG. 2 is a partially exploded perspective view illustrating the pneumatic tire 1 according to the first embodiment of the present invention. FIG. 3 is a sectional view illustrating the pneumatic tire 1 according to the first embodiment of the present invention.

As illustrated in FIG. 1, the pneumatic tire 1 is formed with a circumferential recessed portion 100, which extends along the tire circumferential direction, at the tire side portion 20 positioned between a tread portion 10 making contact with a road surface at the time of travelling and a bead. Furthermore, as illustrated in FIG. 2 and FIG. 3, the pneumatic tire 1 includes a carcass 40 forming a frame of the pneumatic tire 1, a bead unit 30 for fitting the carcass 40 to a rim flange 61 (not illustrated in FIG. 2), and a belt layer 50 disposed at an outer side in the tire radial direction of the carcass 40 in the tread portion 10.

The carcass 40 includes a carcass cord, and a layer including rubber covering the carcass cord. The belt layer 50 is configured by impregnating a rubber component into a steel cord. Furthermore, the belt layer 50 includes a plurality of layers, wherein the respective layers are stacked along the tire radial direction. The bead unit 30 is disposed along the tire circumferential direction, and is disposed at both sides of the tread width direction with respect to a tire equator line CL. In addition, since the pneumatic tire 1 has a line symmetric structure with respect to the tire equator line CL, FIG. 2 and FIG. 3 illustrate only one side thereof.

(1.2) Configuration of Circumferential Recessed Portion 100

Next, the configuration of the circumferential recessed portion 100 will be described with reference to the drawings. FIG. 4(*a*) is a partially enlarged perspective view of the circumferential recessed portion 100 according to the first embodiment. FIG. 4(*b*) is a partially enlarged plan view of the circumferential recessed portion 100 according to the first embodiment.

As illustrated in FIGS. 4(*a*) and (*b*), the circumferential recessed portion 100 is continuously formed along the tire circumferential direction. In the state in which the pneumatic tire 1 is mounted in a rim wheel 60, the circumferential recessed portion 100 is formed in a range R from the position of a tire maximum width portion m to the position of an upper end portion 61*a* of the rim flange 61 of the rim wheel 60. More preferably, in a section in the tread width direction, the circumferential recessed portion 100 is formed in a range Ra of 15% to 30% of a tire's section height H from the lower end of the pneumatic tire 1 (refer to FIG. 3). In addition, the state in which the pneumatic tire 1 is mounted in the rim wheel 60 represents that the pneumatic tire 1 is mounted in a standard rim described in ETRTO at air pressure corresponding to the maximum load described in ETRTO. Furthermore, the position of the upper end portion 61*a* of the rim flange 61 indicates the position of an outer end portion in the tire radial direction of the rim flange 61.

In the first embodiment, the circumferential recessed portion 100 is formed from the outer surface of the tire side portion 20 to a first wall surface 101 and a second wall surface 102 extending inward in the tread width direction, and a bottom surface 103 positioned between the first wall surface 101 and the second wall surface 102.

The first wall surface 101 is positioned at an outer side in the tire radial direction. The second wall surface 102 is positioned at an inner side in the tire radial direction. An angle formed by the first wall surface 101/the second wall surface 102 and the outer surface of the tire side portion 20 is 90 degrees. That is, the first wall surface 101 and the second wall surface 102 are formed to be approximately parallel to each other. The bottom surface 103 is positioned at an inner side in the tread width direction from the outer surface of the tire side portion 20, and is connected to inner ends in the tread width direction of the first wall surface 101 and the second wall surface 102. An angle formed by the bottom surface 103 and the first wall surface 101/the second wall surface 102 is 90 degrees. That is, the circumferential recessed portion 100 is formed to be recessed toward the inner side from the outer surface in the tread width direction in the tire side portion 20. Furthermore, the circumferential recessed portion 100 is recessed, so that the pneumatic tire 1 reduces the volume of rubber forming the tire side portion 20.

A length L1 in the tire radial direction of the circumferential recessed portion 100 is formed to be the length in the range of 100 mm to 150 mm according to the size of the pneumatic tire 1, the type of a vehicle in which the pneumatic tire 1 is to be mounted, and the like. Furthermore, a depth H in the tread width direction of the circumferential recessed portion 100 is formed to be the depth in the range of 10 mm to 25 mm according to the size of the pneumatic tire 1, the type of a vehicle in which the pneumatic tire 1 is to be mounted, and the like. In addition, the length L1 in the tire radial direction of the circumferential recessed portion 100 is the length in the tire radial direction from an intersection point between the outer surface of the tire side portion 20 and the first wall surface 101 to an intersection point between the outer surface of the tire side portion 20 and the second wall surface 102.

Next, a first block and a second block formed in the circumferential recessed portion 100 will be described with reference to the drawings.

As illustrated in FIGS. 4(*a*) and (*b*), the circumferential recessed portion 100 is provided with a plurality of first blocks 110 that are protruded toward the outer side in the tread width direction from the bottom surface 103, and extend to protrude from the first wall surface 101 to the inner side in the tire radial direction. Furthermore, the circumferential recessed portion 100 is provided with a plurality of second blocks 120 that are protruded toward the outer side in the tread width direction from the bottom surface 103, and extend to protrude from the second wall surface 102 to the outer side in the tire radial direction. That is, in the first embodiment, a radial direction-outer end portion, which is an outer end portion in the tire radial direction of the first block 110, is connected to the first wall surface 101, and a radial direction-inner end portion, which is an inner end portion in the tire radial direction of the second block 120, is connected to the second wall surface 102. The radial direction-outer end portion of the first block 110 is positioned at the outer side in the tire radial direction from the center in the tire radial direction in the circumferential recessed portion 100. The radial direction-inner end portion of the second block 120 is positioned at the inner side in the tire radial direction from the center in the tire radial direction in the circumferential recessed portion 100. In addition, the center in the tire radial direction in the circumferential recessed portion 100 is a midpoint of an average length of the circumferential recessed portion 100 in the tire radial direction. Specifically, the center in the tire radial direction in the circumferential recessed portion 100 is a midpoint of an average length in the tire radial direction between the intersection point between the outer surface of the tire side portion 20 and the first wall surface 101 and the intersection point between the outer surface of the tire side portion 20 and the second wall surface 102.

In the first embodiment, the first block 110 and the second block 120 are formed to have a radial shape when a center C (refer to FIG. 1) of the pneumatic tire 1 in the tire radial direction is used as a reference point. Furthermore, the first block 110 and the second block 120, which face each other in the tire radial direction, are formed in a straight line in the tire radial direction.

The first block 110 has an inner front end portion 110a positioned at the inner side in the tire radial direction and the second block 120 has an outer front end portion 120a positioned at the outer side in the tire radial direction. The inner front end portion 110a and the outer front end portion 120a are formed to be separated from each other in the tire radial direction.

Widths W in the tire circumferential direction of the first block 110 and the second block 120 are approximately equal to each other. The widths W in the tire circumferential direction of the first block 110 and the second block 120 are formed in the range of 2 mm to 10 mm.

A distance L2 along the tire radial direction between the inner front end portion 110a of the first block 110 and the outer front end portion 120a of the second block 120 is formed to be in the range of 15% to 80% with respect to a pitch P in the tire circumferential direction of the first block 110 and the second block 120. In addition, as illustrated in FIG. 4(b), the pitch P in the tire circumferential direction is a straight-line distance along the circumferential direction between the center in the tire circumferential direction of the first block 110 (or the second block 120) and the center in the tire circumferential direction of an adjacent different first block 110 (or an adjacent different second block 120).

Furthermore, in the first embodiment, the depth H in the tread width direction of the circumferential recessed portion 100, the pitch P in the tire circumferential direction of the first block 110 (or the second block 120), and the width W in the tire circumferential direction of the first block 110 (or the second block 120) are formed to satisfy a relation of $1.0 \leq P/H \leq 50.0$ and $1.0 \leq (P-W)/W \leq 100.0$.

(1.3) State of Turbulence Generation

Next, a state of turbulence generation by the circumferential recessed portion 100 according to the first embodiment will be described with reference to the drawings.

FIG. 5(a) is a diagram for explaining a state of turbulence generation and is a partially enlarged sectional view in the tread width direction of the circumferential recessed portion 100. FIG. 5(b) is a diagram for explaining the state of the turbulence generation and is a partially enlarged plan view of the circumferential recessed portion 100.

As illustrated in FIG. 5(a), as the pneumatic tire 1 rotates, a flow S1 of the air making contact with the bottom surface 103 in the circumferential recessed portion 100 is separated from the bottom surface 103 at the first block 110 (or the second block 120), and climbs over the first block 110 (or the second block 120). At this time, at a rear surface side (a right side of the first or second block in FIGS. 5(a) and (b)) of the first block 110 (or the second block 120), a portion (a region), in which the flow of the air is stagnated, is generated. Then, the flow S1 of the air is re-attached to the bottom surface 103 between the first block 110 (or the second block 120) and the next first block 110 (or the next second block 120), and is separated again at the next first block 110 (or the next second block 120). At this time, at a front surface side (a left side of the first or second block in FIGS. 5(a) and (b)) of the first block 110 (or the second block 120), a portion (a region), in which the flow of the air is stagnated, is generated.

Furthermore, when the flow S1 of the air climbs over the first block 100 and goes toward the bottom surface 108, an air 52, which flows in the portion (the region) in which the flow of the air is stagnated, takes away heat stagnated, at the rear surface side of the first block 110 (or the second block 120), and flows to be drawn into the flow S1 of the air.

Furthermore, when the flow S1 of the air is separated from the bottom surface 103 and climbs over the next first block 110 (or the next second block 120), an air 83, which flows in the portion (the region) in which the flow of the air is stagnated, takes away heat stagnated at the front surface side of the first block 110 (or the second block 120), and flows to be drawn into the flow S1 of the air.

Furthermore, as illustrated in FIG. 5(b), in the circumferential recessed portion 100, since the first block 110 and the second block 120 are formed to be separated from each other in the tire radial direction, when the pneumatic tire 1 rotates, a flow S4 of the air, which flows between the inner front end portion 110a of the first block 110 and the outer front end portion 120a of the second block, is generated. Furthermore, since the flow S4 of the air flows without climbing over the first block 110 and the second block 120, the flow becomes faster as compared with the flow S1 of the air illustrated in FIG. 5(a). Therefore, in the circumferential recessed portion 100, the airs 52 and 53, which flow in the portion (the region) in which the flow of the air is stagnated, take away heat stagnated at the rear surface side and the front surface side of the first block 110 (or the second block 120), and flow to be drawn into the flow S4 of the air.

As described above, by the flow S1 of the air climbing over the first block and the second block and the flow S4 of the air flowing between the inner front end portion 110a of the first block 110 and the outer front end portion 120a of the second block, the air having entered the circumferential recessed portion 100 of the pneumatic tire 1 flows as turbulence.

(1.4) Operation and Effect

Next, operation and effect of the pneumatic tire according to the first embodiment will be described.

The pneumatic tire 1 according to the first embodiment is formed on the outer surface of the tire side portion 20 thereof with the circumferential recessed portion 100 extending in the tire circumferential direction, and in the circumferential recessed portion 100, the plurality of first blocks 110 extending inward in the tire radial direction from the first wall surface 101 and the plurality of second blocks 120 extending outward in the tire radial direction from the second wall surface 102 are formed in the straight line in the tire radial direction. The inner front end portion 110a of the first block 110 and the outer front end portion 120a of the second block 120 are separated from each other in the tire radial direction. Accordingly, as the pneumatic tire 1 rotates, turbulence of the air is generated in the circumferential recessed portion 100. Specifically, the air flowing through the outer surface of the tire side portion 20 enters the circumferential recessed portion 100 and flows while climbing over the first block 110 and the second block 120. Thus, the air having entered the circumferential recessed portion 100 flows as turbulence while being repeatedly attached and separated to/from the first wall surface 101, the second wall surface 102, and the bottom surface 103. At this time, the flow of the air having entered the circumferential recessed portion 100 takes away heat of the bead unit 30 with temperature increased by the rotation of the pneumatic tire 1. That is, heat dissipation is promoted from the circumferential recessed portion 100, so that it is possible to suppress an increase in the temperature of the bead unit 30. As a consequence, it is possible to suppress the deterioration of the tire due to an increase in the temperature of the bead unit 30, thereby improving the endurance of the pneumatic tire 1.

Furthermore, the pneumatic tire 1 according to the first embodiment is formed with the circumferential recessed portion 100, so that it is possible to reduce the volume of rubber of the bead unit 30 as compared with the case in which the circumferential recessed portion 100 is not formed. That is, in the bead unit 30, the amount of rubber deformed by the rotation of the pneumatic tire 1 is reduced. Consequently, it is possible to suppress heat generation due to the deformation of the rubber of the bead unit 30. Moreover, it is possible to reduce the amount of rubber for manufacturing the pneumatic tire 1, thereby suppressing the manufacturing cost of the pneumatic tire 1.

Furthermore, in the first embodiment, in the section along the tread width direction and the tire radial direction, the circumferential recessed portion 100 is formed in the range Ra of 15% to 30% of the tire's section height H from the lower end of the pneumatic tire 1. That is, the circumferential recessed portion 100 is formed in the range Ra near the bead unit 30. Furthermore, since the bead unit 30 is fitted to the hard rim wheel 60, deformation due to crash into the rim flange 61 or friction with the rim flange 61 easily occurs in the state in which the pneumatic tire 1 is mounted in a vehicle, so that the temperature of the bead unit 30 is easily increased due to heat generation. In this regard, in the pneumatic tire 1 according to the first embodiment, the circumferential recessed portion 100 is formed in the aforementioned range Ea, so that an effect of suppressing an increase in the temperature of the bead unit 30, which easily generates heat, becomes large.

Furthermore, in the first embodiment, the depth in the tread width direction of the circumferential recessed portion 100 is formed in the range of 10 mm to 25 mm. When the depth in the tread width direction of the circumferential recessed portion 100 is smaller than 10 mm, since the air flowing through the outer surface of the tire side portion 20 is difficult to enter the circumferential recessed portion 100, turbulence is difficult to be generated in the circumferential recessed portion 100. Accordingly, heat dissipation in the bead unit 30 is reduced. Meanwhile, when the depth in the tread width direction of the circumferential recessed portion 100 is larger than 25 mm, the air having entered the circumferential recessed portion 100 is difficult to be attached to the bottom surface 103. In this case, in a region near the bottom surface 103 of the circumferential recessed portion 100, no turbulence of the air is generated and thus the warm air is stagnated. Accordingly, heat dissipation in the bead unit 30 is reduced.

Furthermore, in the first embodiment, the length in the tire radial direction of the circumferential recessed portion 100 is formed in the range of 100 mm to 150 mm. When the length in the tire radial direction of the circumferential recessed portion 100 is smaller than 100 mm, sufficient air for promoting the heat dissipation in the bead unit 30 is difficult to enter the circumferential recessed portion 100. Meanwhile, when the length in the tire radial direction of the circumferential recessed portion 100 is larger than 150 mm, sufficient air for promoting the heat dissipation in the bead unit 30 easily enters the circumferential recessed portion 100, but the volume of the rubber forming the bead unit 30 is reduced, so that the stiffness of the bead unit 30 is reduced.

In the first embodiment, the widths W in the tire circumferential direction of the first block 110 and the second block 120 are formed in the range of 2 mm to 10 mm. When the widths W in the tire circumferential direction of the first block 110 and the second block 120 are smaller than 2 mm, the first block 110 and the second block 120 are likely to be vibrated by the flow of the air drawn into the circumferential recessed portion 100. Moreover, when the widths W in the tire circumferential direction of the first block 110 and the second block 120 are smaller than 2 mm, stiffness of each block is reduced, so that the blocks are likely to be broken when driving on a rough road. Meanwhile, when the widths W in the tire circumferential direction of the first block 110 and the second block 120 are larger than 10 mm, the amount of rubber forming each block is increased, so that heat is easily generated. Therefore, an effect of suppressing an increase in the temperature of the bead unit 30 due to the formation of the circumferential recessed portion 100 is reduced.

In the first embodiment, the distance L2 along the tire radial direction between the inner front end portion 110a of the first block 110 and the outer front end portion 120a of the second block 120 is formed to be in the range of 15% to 30% with respect to the pitch P the tire circumferential direction of the first block 110 (or the second block 120). When the distance L2 is smaller than 15% with respect to the pitch P, the flow of the air having entered the circumferential recessed portion 100 is disturbed, so that many portions (regions), in which the air is stagnated in the circumferential recessed portion 100, are generated. Meanwhile, when the distance L2 is larger than 30% with respect to the pitch P, since the pitch P with respect to the distance L2 is small, the flow of the air repeatedly attached and separated to/from the bottom surface 103 is difficult to be generated.

In the first embodiment, the depth H in the tread width direction of the circumferential recessed portion 100, the pitch P in the tire circumferential direction of each block, and the width W in the tire circumferential direction of each block are formed to satisfy a relation of $1.0 \le P/H \le 50.0$ and $1.0 \le (P-W)/W \le 100.0$. Accordingly, the range of P/H is defined, so that the state of the flow of the air drawn into the circumferential recessed portion 100 can be approximately expressed by P/H. When the pitch P is too short, the air having entered the circumferential recessed portion 100 is difficult to be attached to the bottom surface 103. In this case, in a region near the bottom surface 103 of the circumferential recessed portion 100, no turbulence of the air is generated and thus the warm air is stagnated. Furthermore, when the pitch P is too long, turbulence is difficult to be generated similarly to the case in which the first block 110 and the second block 120 are not formed. Furthermore, (P−W)/W indicates a ratio of the width W of the first block 110 (or the second block 120) with respect to the pitch P. When (P−W)/W is too small, an area of a surface, on which an increase in the temperature is to be suppressed by heat dissipation, is equal to a surface area of each block. Since each block is made of rubber, it is not possible to expect a heat dissipation improvement effect due to an increase in the surface area, so that a minimum value of (P−W)/W is set to 1.

(2) Second Embodiment

Next, with reference to FIG. 6, a pneumatic tire 2 according to a second embodiment of the present invention will be described. In addition, a detailed description for the same configuration as that of the first embodiment will be appropriately omitted. FIG. 6(a) is a partially enlarged perspective view of a circumferential recessed portion 200 according to the second embodiment. FIG. 6(b) is a partially enlarged plan view of the circumferential recessed portion 200 according to the second embodiment.

The pneumatic tire 2 according to the second embodiment is formed at the tire side portion 20 thereof with the circumferential recessed portion 200. The circumferential recessed portion 200 is provided with a plurality of first blocks 210 that extend to protrude from a first wall surface 201 positioned at an outer side in the tire radial direction to an inner side in the tire radial direction. Furthermore, the circumferential recessed portion 200 is provided with a plurality of second blocks 220 that extend to protrude from a second wall surface 202 positioned at an inner side in the tire radial direction to an outer side in the tire radial direction.

The circumferential recessed portion 200 according to the second embodiment is different from the circumferential recessed portion 100 according to the first embodiment, in that the first block 210 and the second block 220 are formed alternately in the tire circumferential direction.

In accordance with the pneumatic tire 2 according to the second embodiment, as the pneumatic tire 2 rotates, shift occurs between when the air having entered the circumferential recessed portion 200 climbs over the first block 210 and between when the air having entered the circumferential recessed portion 200 climbs over the second block 220. Accordingly, a position in the tire circumferential direction of a portion (a region), in which the flow of the air generated at a rear surface side of the first block 210 is stagnated, is shifted from a position in the tire circumferential direction of a portion (a region) in which the flow of the air generated at a rear surface side of the second block 220 is stagnated. Thus, the stagnation portions (regions) are distributed in the tire circumferential direction, so that the air having entered the circumferential recessed portion 200 leads easily to turbulence. As a consequence, the flow of the air in the portion (the region), in which the flow of the air easily is stagnated, is active, so that it is possible to suppress an increase in the temperature of the bead unit 30 from the circumferential recessed portion 200. As a consequence, it is possible to improve the endurance of the pneumatic tire 2.
(Modification)

Next, with reference to FIGS. 7(a) and (b), a pneumatic tire 2X according to a modification of the second embodiment will be described. In addition, a detailed description for the same configuration as that of the second embodiment will be appropriately omitted. FIG. 7(a) is a partially enlarged perspective view of a circumferential recessed portion 200X according to the modification of the second embodiment. FIG. 7(b) is a partially enlarged plan view of the circumferential recessed portion 200X according to the modification of the second embodiment.

The pneumatic tire 2X according to the modification is formed at a tire side portion 20X thereof with the circumferential recessed portion 200X, wherein the circumferential recessed portion 200X is provided with a plurality of first blocks 210X that extend to protrude from a first wall surface 201X positioned at an outer side in the tire radial direction to an inner side in the tire radial direction and a plurality of second blocks 220X that extend to protrude from a second wall surface 202X positioned at an inner side in the tire radial direction to an outer side in the tire radial direction.

The circumferential recessed portion 200X according to the modification is different from the circumferential recessed portion 200 according to the second embodiment, in that an inner front end portion 210Xa of the first block 210X is positioned at the inner side in the tire radial direction from an outer front end portion 220Xa of the second block 220X (the outer front end portion 220Xa of the second block 220X is positioned at the outer side in the tire radial direction from the inner front end portion 210Xa of the first block 210X). That is, the circumferential recessed portion 200X according to the modification has an overlap region R in which the first block 210X and the second block 220X overlap each other in the tread width direction.

In accordance with the pneumatic tire 2X according to the modification, the rotation of the pneumatic tire 2X causes the generation of the flow of the air climbing over the first block 210X, the flow of the air climbing over the second block 220X, and the flow of the air climbing over the first block 210X and the second block 220X in the overlap region R. Accordingly, the air having entered the circumferential recessed portion 200X more actively flows as turbulence to be repeatedly attached and separated to/from the first wall surface 201X, the second wall surface 202X, and a bottom surface 203X. Consequently, the flow of the air in a portion (a region), in which the flow of the air is easily stagnated, becomes active, so that it is possible to suppress an increase in the temperature of the bead unit 30 from the circumferential recessed portion 200X. As a consequence, it is possible to improve the endurance of the pneumatic tire 2X.

(3) Third Embodiment

Next, with reference to FIGS. 8(a) and (b), a pneumatic tire 3 according to a third embodiment will be described. In addition, a detailed description for the same configuration as that of the first embodiment will be appropriately omitted. FIG. 8(a) is a partially enlarged perspective view of a circumferential recessed portion 300 according to the third embodiment. FIG. 8(b) is a partially enlarged plan view of the circumferential recessed portion 300 according to the third embodiment.

The pneumatic tire 3 according to the third embodiment is formed at the tire side portion 20 thereof with the circumferential recessed portion 300. The pneumatic tire 3 is provided with a plurality of first blocks 310 that extend to protrude from a first wall surface 301 positioned at an outer side in the tire radial direction to an inner side in the tire radial direction and a plurality of second blocks 320 that extend to protrude from a second wall surface 302 positioned at an inner side in the tire radial direction to an outer side in the tire radial direction. In addition, the first block 310 and the second block 320 have the same configurations as those of the first block 110 and the second block 120 of the circumferential recessed portion 100 according to the first embodiment.

The third embodiment is different from the first embodiment, in that the circumferential recessed portion 300 according to the third embodiment is provided with a third block 330 that is separated from the first wall surface 301 and the second wall surface 802 in the tire radial direction while being separated from the first block 310 and the second block 320 in the tire circumferential direction. The third block 330 is formed to protrude toward an outer side in the tread width direction from a bottom surface 303 of the circumferential recessed portion 300. In the third embodiment, a width W in the tire circumferential direction and a height H in the tread width direction of the third block 380 are equal to those of the first block 310 and the second block 320. The length in the tire radial direction of the third block 330 is formed to be in the range of 35 mm to 55 mm. Furthermore, the third block 380 is positioned at a position closer to one of the first block 310 and the second block 320, than a point of ½ the pitch P of the first block 310 and the second block 320. A distance L3 in the tire circumferential direction between the third block 330 and the first block 310/the second block 320 is formed to be in the range of 5% to 10% of the pitch P.

Furthermore, as illustrated in FIGS. 8(a) and (b), the third block 330 has an outer end portion 330b positioned at an outer side in the tire radial direction and an inner end portion 330c positioned at an inner side in the tire radial direction, wherein the outer end portion 330b is positioned at the outer side in the tire radial direction from an inner front end portion 310a of the first block 310, and the inner end portion 330c is positioned at the inner side in the tire radial direction from an outer front end portion 320a of the second block 320. That is, the tire radial direction-inner end portion of the first block 310 and the tire radial direction-outer end portion of the second block 320 are formed to overlap the tire radial direction-both end portions of the third block 330 in the tire circumferential direction.

In accordance with the pneumatic tire 3 according to the third embodiment, the third block 330 is formed in the circumferential recessed portion 300, so that turbulence of the air having entered the circumferential recessed portion 300 is easily generated. Specifically, the air having entered the circumferential recessed portion 300 climbs over the third block 330 as well as the first block 310 and the second block 320, and flows in the circumferential recessed portion 300. That is, the air flows as large turbulence to be repeatedly attached and separated to/from the first wall surface 301, the second wall surface 302, and the bottom surface 303. That is, the air having entered the circumferential recessed portion 300 flows while taking away heat in a portion (a region) in which the air is stagnated at the rear surface sides of the first block 310, the second block 320, and the third block 330. As a consequence, it is possible to further suppress an increase in the temperature of the bead unit 30.

Furthermore, the tire radial direction-inner end portion of the first block 310 and the tire radial direction-outer end portion of the second block 320 are formed to overlap the tire radial direction-both end portions of the third block 330 in the tire circumferential direction. Accordingly, as compared with the case in which the tire radial direction-inner end portion of the first block 310 and the tire radial direction-outer end portion of the second block 320 are not formed to overlap the tire radial direction-both end portions of the third block 330 in the tire circumferential direction, turbulence of the air having entered the circumferential recessed portion 300 is easily generated. Specifically, as the pneumatic tire 3 rotates, from the air colliding with the third block 330, flow climbing over the third block 330 and flow directed to the both sides in the tire radial direction of the third block 330 are generated. Due to the flow of the air directed to both sides in the tire radial direction of the third block 330, the flow of the air in a portion, in which the air is easily stagnated, on the rear surfaces of the first block 310 and the second block 320 becomes active. Thus, heat dissipation in the circumferential recessed portion 300 is promoted, so that it is possible to further suppress an increase in the temperature of the bead unit 30. As a consequence, it is possible to improve the endurance of the pneumatic tire 3.

(4) Fourth Embodiment

Figure 9:
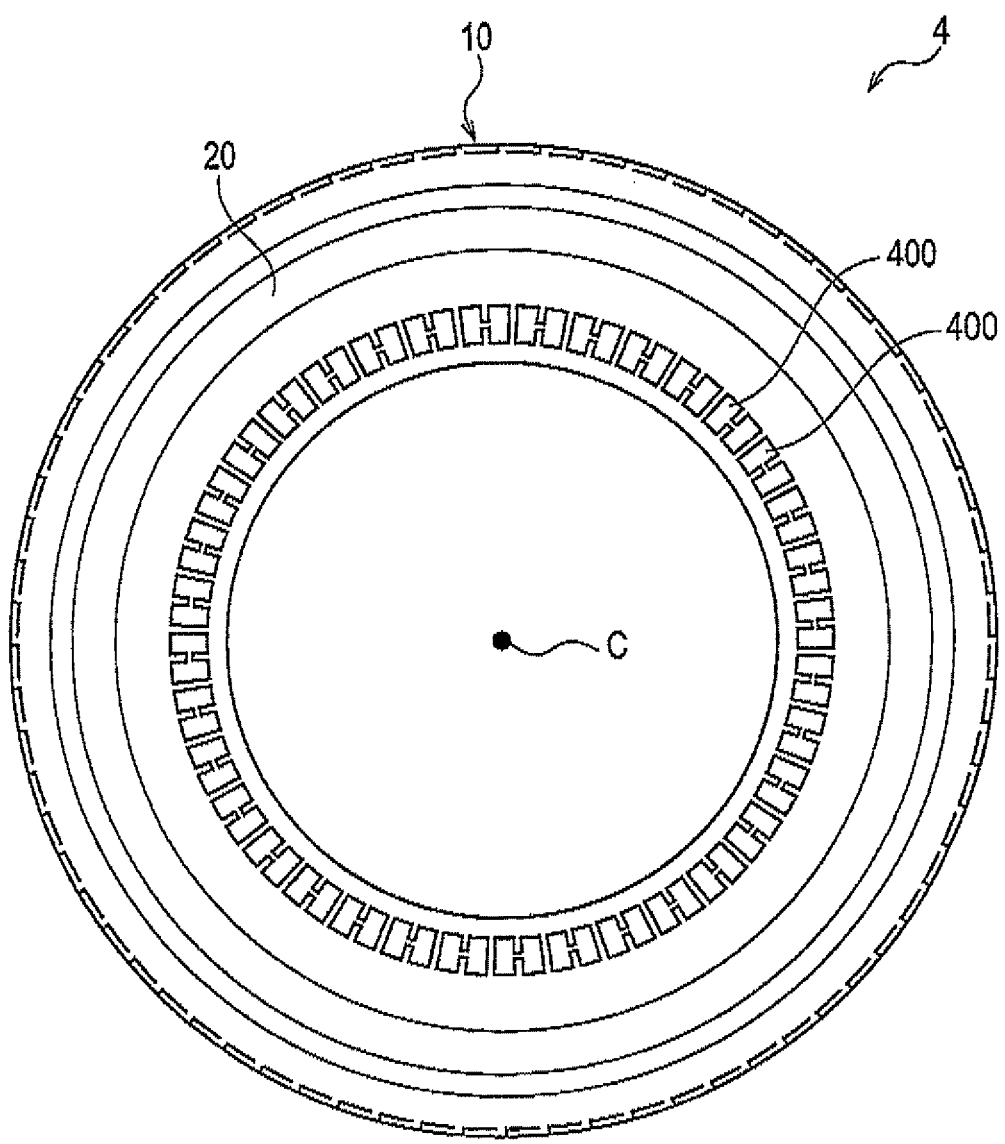
FIG. 9 is a diagram seen from a side wall surface at the tire side portion 20 side in a pneumatic tire 4 according to a fourth embodiment of the present invention.

Next, with reference to FIG. 9 and FIGS. 10(a) and (b), pneumatic tire 4 according to a fourth embodiment will be described. In addition, a detailed description for the same configuration as that of the first embodiment will be appropriately omitted. FIG. 9 is a diagram seen from a side wall surface at the tire side portion 20 side in the pneumatic tire 4 according to the fourth embodiment of the present invention. FIG. 10(a) is a partially enlarged perspective view of a circumferential recessed portion 400 according to the fourth embodiment. FIG. 10(b) is a partially enlarged plan view of the circumferential recessed portion 400 according to the fourth embodiment.

The pneumatic tire 4 according to the fourth embodiment is formed at the tire side portion 20 thereof with the circumferential recessed portion 400.

The pneumatic tire 4 is provided with a first block 410 that extends to protrude from a first wall surface 401 positioned at an outer side in the tire radial direction to an inner side in the tire radial direction and a second block 420 that extends to protrude from a second wall surface 402 positioned at an inner side in the tire radial direction to an outer side in the tire radial direction. In addition, the first block 410 and the second block 420 have the same configurations as those of the first block 110 and the second block 120 of the circumferential recessed portion 100 according to the first embodiment.

The circumferential recessed portion 400 according to the fourth embodiment is different from the circumferential recessed portion 100 according to the first embodiment, in that only one first block 410 and only one second block 420 are formed in the circumferential recessed portion 400.

As illustrated in FIG. 9 and FIGS. 10(a) and (b), the pneumatic tire 4 has a plurality of circumferential recessed portions 400. In the fourth embodiment, the circumferential recessed portions 400 are formed from the outer surface of the tire side portion 20 to the first wall surface 401, the second wall surface 402, and a third wall surface 404, which extend inward in the tread width direction, and a bottom surface 408 positioned between the first wall surface 401 and the second wall surface 402.

The first wall surface 401, the second wall surface 402, and the bottom surface 403 have the same configurations as those of the first wall surface 101, the second wall surface 102, and the bottom surface 103 according to the first embodiment. The first wall surface 401 and the second wall surface 402 extend along the tire circumferential direction. The third wall surface 404 is positioned between the first wall surface 401 and the second wall surface 402 in the tire radial direction. The third wall surface 404 extends along the tire radial direction. An angle formed by the third wall surface 404 and the outer surface of the tire side portion 20 is 90 degrees.

As illustrated in FIGS. 10(a) and (b), in the tire circumferential direction, a fourth block 440 extending in the tire radial direction is formed between the circumferential recessed portions 400. The fourth block 440 extends from the first wall surface 401 to the second wall surface 402. Accordingly, the fourth block 440 does not have a front end portion as with the first block 410 and the second block 420.

The fourth block 440 has the third wall surface 404. A width T in the tire circumferential direction of the fourth block 440 is the width in the tire circumferential direction between the third wall surface 404 of one circumferential recessed portion 400 and the third wall surface 404 at the one circumferential recessed portion 400 side of other circumferential recessed portions 400 adjacent to the one circumferential recessed portion 400.

A length X in the tire circumferential direction of the circumferential recessed portions 400 is formed to be the length, in an appropriate range according to the size of the pneumatic tire 4, the type of a vehicle in which the pneumatic tire 4 is to be mounted, and the like.

In the present embodiment, only one first block 410 and only one second block 420 are formed in the circumferential recessed portion 400. However, a plurality of first blocks 410 may be formed in the circumferential recessed portion 400, and a plurality of second blocks 420 may be formed in the circumferential recessed portion 400.

In accordance with the pneumatic tire 4 according to the fourth embodiment, the fourth block 440 is formed, so that the air flows while climbing over the fourth block 440 as well as the first block 410 and the second block 420 together with the rotation of the pneumatic tire 4. Turbulence generated by the first block 410 and the second block 420 climbs over the fourth block 440 and flows into an adjacent circumferential recessed portion 400. Thus, the turbulence enters the circumferential recessed portion 400 as is. Consequently, the air having entered the circumferential recessed portion 400 flows as turbulence. As a consequence, heat dissipation is promoted from the circumferential recessed portion 400, so that it is possible to suppress an increase in the temperature of the bead unit 30.

Unlike an inner front end portion 410a of the first block 410 or an outer front end portion 420a of the second block 420, the fourth block 440 does not have a front end portion. Thus, since the fourth block 440 has a higher block stiffness as compared with the first block 410 and the second block 420, the breakage of the fourth block 440 is suppressed.

(5) Fifth Embodiment

Figure 11:
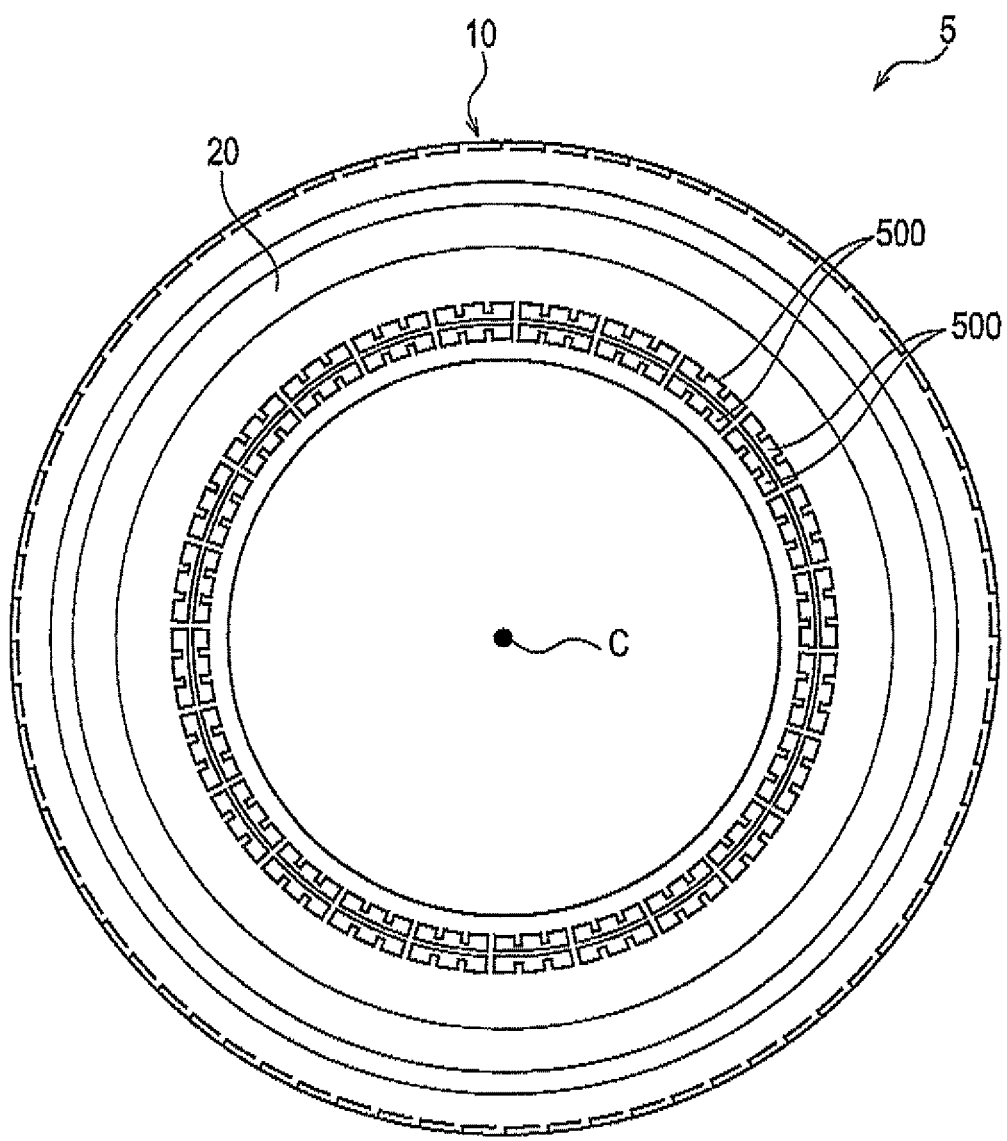
FIG. 11 is a diagram seen from a side wall surface at the tire side portion 20 side in a pneumatic tire 5 according to a fifth embodiment of the present invention.
Figure 13:
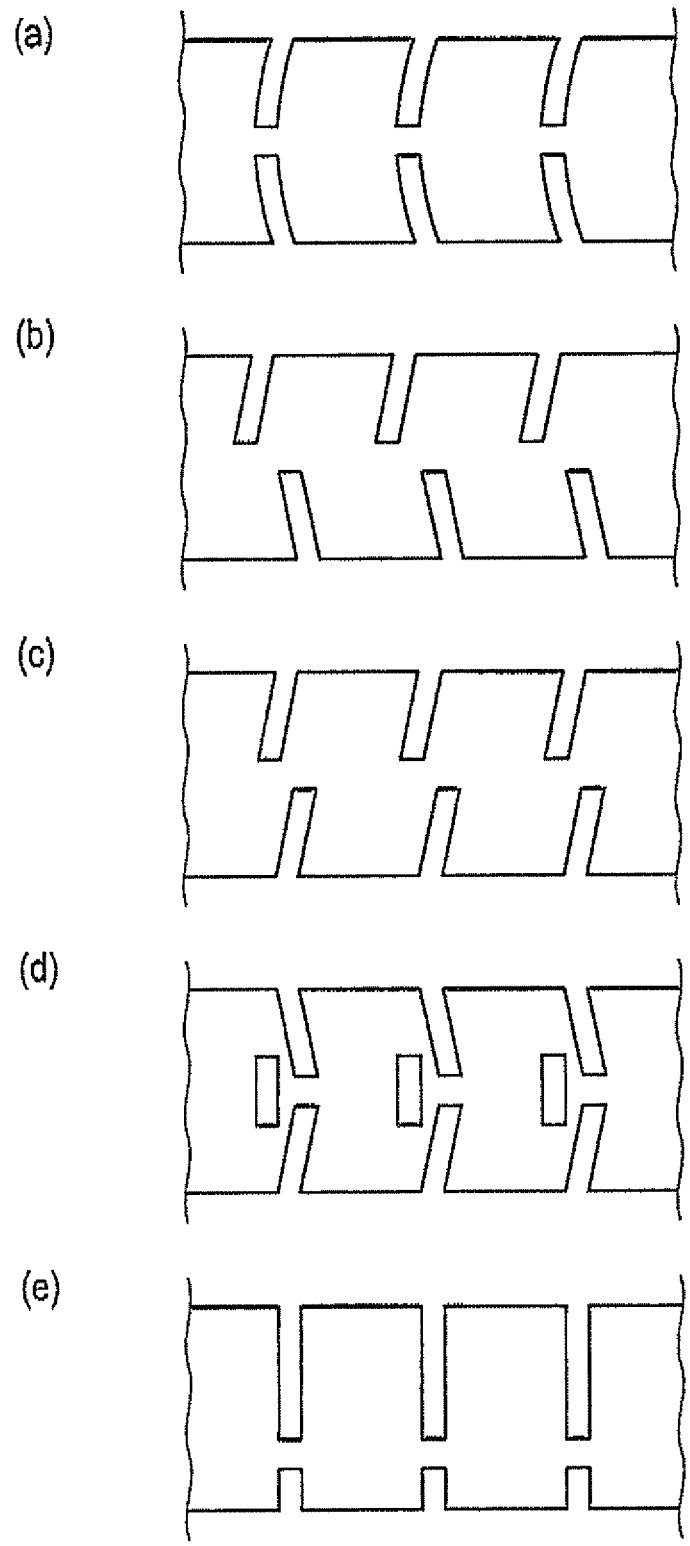
FIG. 13 is a partially enlarged plan view of a circumferential recessed portion according to another embodiment.

Next, with reference to FIG. 11 and FIGS. 12(a) and (b), pneumatic tire 5 according to a fifth embodiment will be described. In addition, a detailed description for the same configuration as that of the first embodiment will be appropriately omitted. FIG. 11 is a diagram seen from a side wall surface at the tire side portion 20 side in the pneumatic tire 5 according to the fifth embodiment of the present invention. FIG. 12(a) is a partially enlarged perspective view of a circumferential recessed portion 500 according to the fifth embodiment. FIG. 12(b) is a partially enlarged plan view of the circumferential recessed portion 500 according to the fifth embodiment.

The pneumatic tire 5 according to the fifth embodiment is formed at the tire side portion 20 thereof with the circumferential recessed portion 500. The pneumatic tire 5 is provided with a first block 510 that extends to protrude from a first wall surface 501 positioned at an outer side in the tire radial direction to an inner side in the tire radial direction and a second block 520 that extends to protrude from a second wall surface 502 positioned at an inner side in the tire radial direction to an outer side in the tire radial direction. In addition, the first block 510 and the second block 520 have the same configurations as those of the first block 110 and the second block 120 of the circumferential recessed portion 100 according to the first embodiment.

The circumferential recessed portion 500 according to the fifth embodiment is different from the circumferential recessed portion 100 according to the first embodiment, in that a circumferential recessed portion 500a provided with the first block 510 and a circumferential recessed portion 500b provided with the second block 520 are formed as the circumferential recessed portion 500.

As illustrated in FIG. 11 and FIGS. 12(a) and (b), the pneumatic tire 5 has a plurality of circumferential recessed portions 500. Each circumferential recessed portion 500 includes the circumferential recessed portion 500a and the circumferential recessed portion 500b.

The circumferential recessed portion 500a is positioned at the outer side in the tire radial direction from the circumferential recessed portion 500b. The circumferential recessed portion 500a is formed from the outer surface of the tire side portion 20 to a first wall surface 501a, a second wall surface 502a, and a third wall surface 504, which extend inward in the tread width direction, and a bottom surface 503 positioned between the first wall surface 501a and the second wall surface 502a.

The first wall surface 501a and the bottom surface 503 have the same configurations as those of the first wall surface 101 and the bottom surface 103 according to the first embodiment. The second wall surface 502a has the same configuration as that of the second wall surface 102 according to the first embodiment, except that the second block 520 is not formed. The first wall surface 501a and the second wall surface 502a extend along the tire circumferential direction. The third wall surface 504 is positioned between the first wall surface 501b and the second wall surface 502b the tire radial direction. The third wall surface 504 extends along the tire radial direction. An angle formed by the third wall surface 504 and the outer surface of the tire side portion 20 is 90 degrees.

The circumferential recessed portion 500b is positioned at the inner side in the tire radial direction from the circumferential recessed portion 500a. The circumferential recessed portion 500b is formed from the outer surface of the tire side portion 20 to a first wall surface 501b, a second wall surface 502b, and the third wall surface 504, which extend inward in the tread width direction, and the bottom surface 503 positioned between the first wall surface 501b and the second wall surface 502b.

The second wall surface 502b and the bottom surface 508 have the same configurations as those of the second wall surface 102 and the bottom surface 103 according to the first embodiment. The first wall surface 501b has the same configurations as that of the first wall surface 101 according to the first embodiment, except that the first block 510 is not formed. The first wall surface 501b and the second wall, surface 502b extend along the tire circumferential direction. The third wall surface 504 is positioned between the first wall surface 501a and the second wall surface 502a in the tire radial direction. The third wall surface 504 extends along the tire radial direction. An angle formed by the third wall surface 504 and the outer surface of the tire side portion 20 is 90 degrees.

The circumferential recessed portion 500 according to the fifth embodiment is different from the circumferential recessed portion 100 according to the first embodiment, in that a circumferential recessed portion 500a provided with the first block 510 and a circumferential recessed portion 500b provided with the second block 520 are formed as the circumferential recessed portion 500.

As illustrated in FIGS. 12(a) and (b), the first block 510 is formed only in the circumferential recessed portion 500a. Accordingly, the first block 510 is not formed in the circumferential recessed portion 500b. The second block 520 is formed only in the circumferential recessed portion 500b. Accordingly, the second block 520 is not formed in the circumferential recessed portion 500a.

The first block 510 has an inner front end portion 510a positioned at the inner side in the tire radial direction, and the second block 520 has an outer front end portion 520a positioned at the outer side in the tire radial direction. The first block 510 is formed in the circumferential recessed portion 500a and the second block 520 is formed in the circumferential recessed portion 500b. Thus, the inner front end portion 510a and the outer front end portion 520a are formed to be separated from each other in the tire radial direction.

A distance L4a along the tire radial direction between the inner front end portion 510a of the first block 510 and the second wall surface 502a is formed to be in the range of 15% to 30% with respect to the pitch P in the tire circumferential direction of the first block 510. A distance L4b along the tire radial direction between the outer front end portion 520a of the second block 520 and the first wall surface 501b is formed to be in the range of 15% to 30% with respect to the pitch P in the tire circumferential direction of the second block 520.

As illustrated in FIGS. 12(a) and (b), in the tire circumferential direction, a fourth block 540 extending in the tire radial direction is formed between the circumferential recessed portions 500. The fourth block 540 extends from the first wall surface 501a of the circumferential recessed portions 500a to the second wall surface 502b of the circumferential recessed portions 500b. Accordingly, the fourth block 540 does not have a front end portion unlike the first block 510 and the second block 520.

The fourth block 540 has the third wall surface 504. The width T in the tire circumferential direction of the fourth block 540 is a width in the tire circumferential direction between the third wall surface 504 of one circumferential recessed portion 500 and the third wall surface 504 at the one circumferential recessed portion 500 side of other circumferential recessed portions 500 adjacent to the one circumferential recessed portion 500.

As illustrated in FIGS. 12(a) and (b), in the tire radial direction, a fifth block 550 extending in the tire circumferential direction is formed between the circumferential recessed portion 500a and the circumferential recessed portion 500b. The fifth block 550 is continuously formed in the tire circumferential direction. Accordingly, the fifth block 550 does not have a front end portion unlike the first block 510 and the second block 520.

The fifth block 550 has the second wall surface 502a and the first wall surface 501b. A width Y in the tire radial direction of the fifth block 550 is the width in the tire radial direction between the second side surface 502a of the circumferential recessed portion 500a and the first wall surface 501b of the circumferential recessed portion 500b.

The length X in the tire circumferential direction of the circumferential recessed portion 500 is formed to be the length in an appropriate range according to the site of the pneumatic tire 5, the type of a vehicle in which the pneumatic tire 5 is to be mounted, and the like. Similarly, a length Ma in the tire radial direction of the circumferential recessed portion 500a and a length L1b in the tire radial direction of the circumferential recessed portion 500b are also formed to be the length in an appropriate range according to the size of the pneumatic tire 5, the type of a vehicle in which the pneumatic tire 5 is to be mounted, and the like.

In the present embodiment, two first blocks 510 are formed in the circumferential recessed portion 500a and two second blocks 520 are formed in the circumferential recessed portion 500b. However, the numbers of the first blocks 510 and the second blocks 520 may be appropriately adjusted. Accordingly, three or more first blocks 510 and three or more second blocks 520 may be formed, respectively. One first block 510 and one second block 520 may be formed.

In accordance with the pneumatic tire 5 according to the fifth embodiment, the fourth block 540 is formed. Thus, the air flows while climbing over the fourth block 540 as well as the first block 510 and the second block 520 together with the rotation of the pneumatic tire 5. Accordingly, turbulence generated by the first block 510 or the second block 520 climbs over the fourth block 540 and flows into an adjacent circumferential recessed portion 500 in the tire circumferential direction. Moreover, in accordance with the pneumatic tire 5 according to the fifth embodiment, the fifth block 550 is formed. The turbulence generated by the first block 510 or the second block 520 climbs over the fifth block 550 and flows into an adjacent circumferential recessed portion 500 in the tire radial direction. Since the turbulence can flow into from the tire radial direction as well as the tire circumferential direction, the air having entered the circumferential recessed portion 500 leads further easily to turbulence. As a consequence, heat dissipation is easily promoted from the circumferential recessed portion 500, so that it is possible to suppress an increase in the temperature of the bead unit 30.

Unlike the inner front end portion 510a of the first block 510 or the outer front end portion 520a of the second block 520, the fourth block 540 and fifth block 550 do not have a front end portion. Thus, the fourth block 540 and fifth block 550 have a higher block stiffness as compared with the first block 510 and the second block 520, the breakage of the fourth block 540 and fifth block 550 is suppressed.

(6) Comparative Evaluations

In order to clarify the effects of the tire according to the present invention, comparative evaluations performed using pneumatic tires according to the following conventional example, comparative example, and examples will be described. Specifically, (6. 1) Evaluation Method and (6. 2) Evaluation Results will, be described. It is noted that the present invention is not limited to these examples in any way.
(6. 1) Evaluation Method A test was performed using five types of pneumatic tires and the temperature of a tire side portion was evaluated.

The conventional example used a pneumatic tire not formed with a circumferential recessed portion at the tire side portion thereof. The comparative example used, a pneumatic tire provided, at the tire side portion thereof, with a block protruding in the tread width direction from the outer surface of the tire side portion. A first example used the pneumatic tire according to the first embodiment, a second example used the pneumatic tire according to the second embodiment, and a third example used the pneumatic tire according to the third embodiment.

Furthermore, for evaluations, first, all tires, as a group of three, were each leaned on a wall for a week, and left. Then, the tires were mounted in TRA normal rim wheels and were mounted in a vehicle with a normal load and a normal inner pressure. Moreover, the vehicle was run for 24 hours, a thermoelectric body was inserted into a fine hole formed in advance at a position of 20 mm at the outer side in the tire radial direction from the upper end portion of the rim flange, and the temperature at the outer side by 5 mm in the tread width direction of the carcass ply was measured at six places uniformly divided in the tire circumferential direction. The evaluation values use an average value of the temperatures measured at the six places, and indicate a temperature difference from the tire of the conventional example. In addition, data regarding the vehicle and the evaluation test is as follows.
Tire size: 59/80R63
Tire type: heavy load tire
Vehicle: dump truck (320 ton)
Vehicle travel speed per hour: 15 km/h
Travel hour: 24 hours
(6. 2) Evaluation Results Evaluation results of each pneumatic tire will be described with reference to Table 1.

TABLE 1

| tire to be evaluated | conventional example | Comparative example | Example 1 | Example 2 | Example 3 |
|---|---|---|---|---|---|
| Projection height | — | 20 mm | — | — | — |
| Projection width | — | 5 mm | — | — | — |
| tire radial direction length of protrusion | — | 110 mm | — | — | — |
| tread width direction depth of circumferential recess | — | — | 20 mm | 20 mm | 20 mm |
| tread width direction width of block | — | — | 5 mm | 5 mm | 5 mm |
| tire radial direction length of circumferential recess | — | — | 38 mm | 74 mm | 110 mm |
| temperature difference from conventional example after 24-hour travel | — | −3.0° C. | −3.1° C. | −4.1° C. | −6.2° C. |

As shown in Table 1 above, the pneumatic tires according to the examples 1, 2, and 3 were proved to have a larger effect of suppressing an increase in the temperature of the bead unit 30, as compared with the pneumatic tires according to the conventional example and the comparative example.

Other Embodiments

As described above, although the content of the present invention was disclosed through the embodiments of the present invention, the descriptions and drawings that form a part of this disclosure are not to be considered as limitation to the present invention. From this disclosure, a variety of alternate embodiments, examples, and applicable techniques will become apparent to one skilled in the art.

Figure 14:
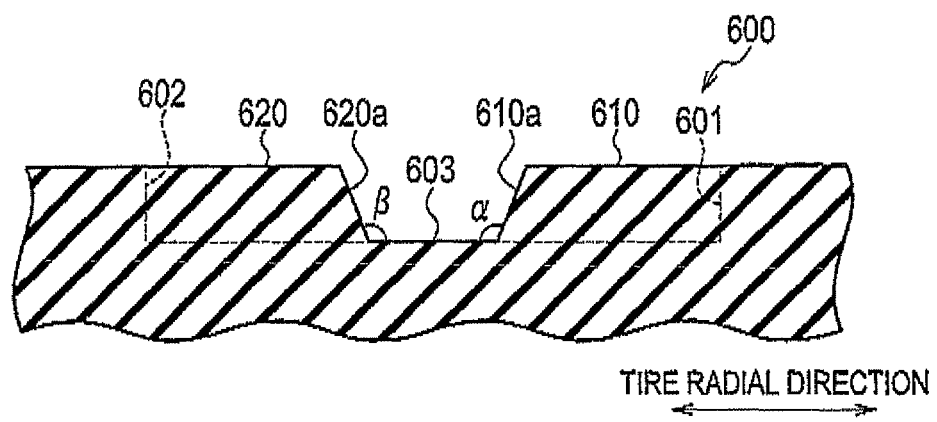
FIG. 14 is a sectional view along the tread width direction and the tire radial direction of a circumferential recessed portion 600 according to another embodiment.
Figure 15:
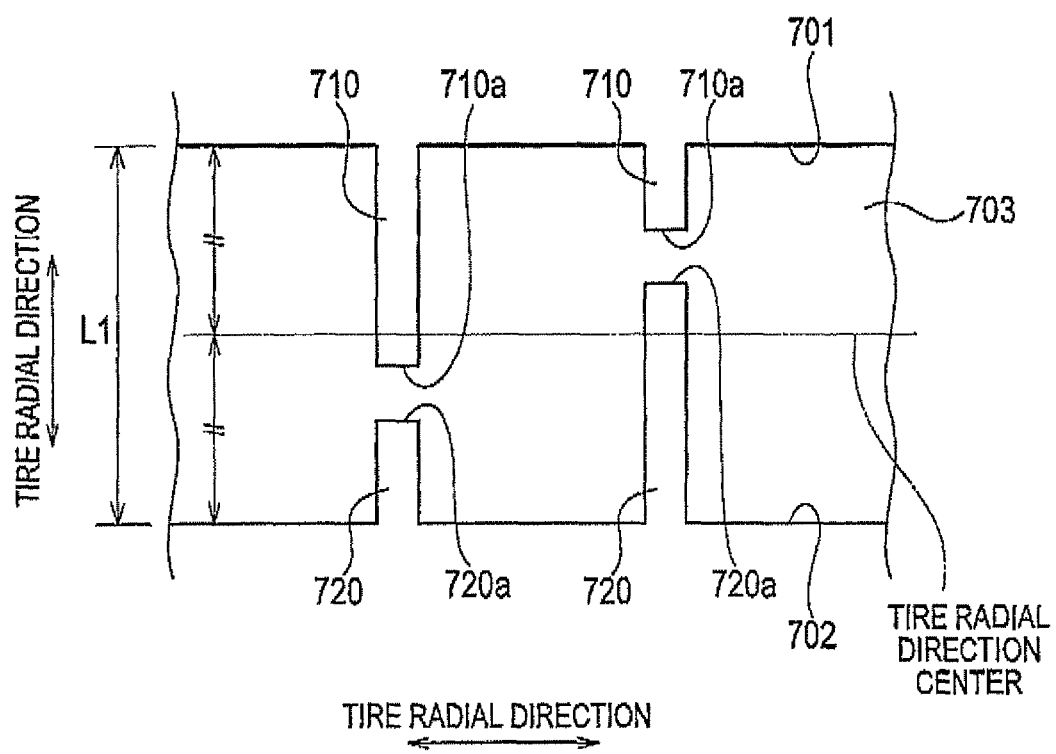
FIG. 15 is a partially enlarged plan view of a circumferential recessed portion 700 according to another embodiment.
Figure 16:
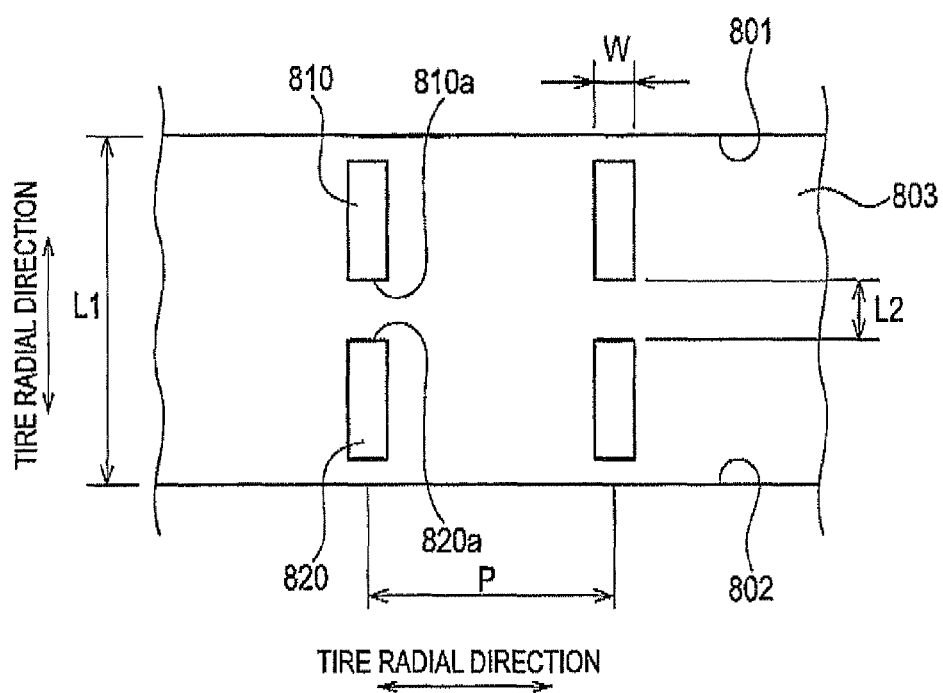
FIG. 16 is a partially enlarged plan view of a circumferential recessed portion 800 according to another embodiment.
Figure 17:
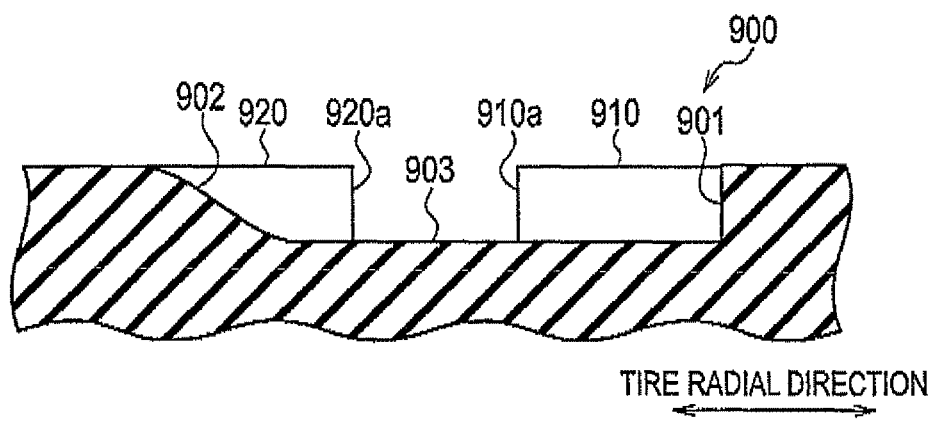
FIG. 17 is a sectional view along the tread width direction and the tire radial direction of a circumferential recessed portion 900 according to another embodiment.
Figure 18:
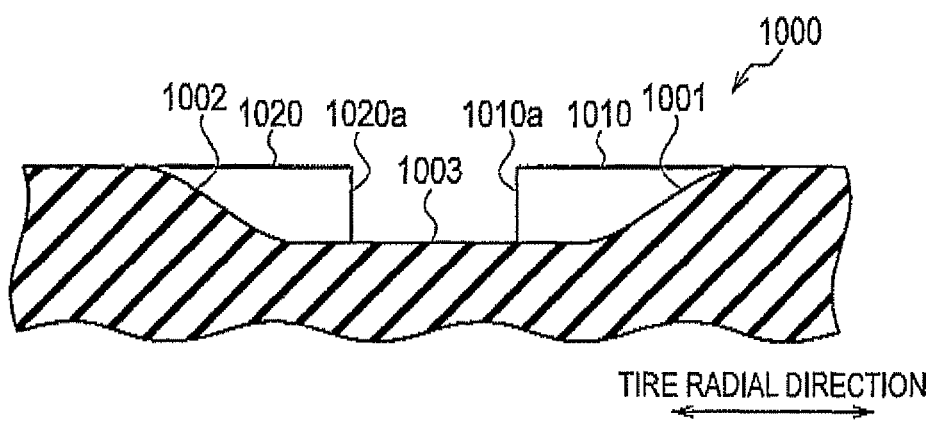
FIG. 18 is a sectional view along the tread width direction and the tire radial direction of a circumferential recessed portion 1000 according to another embodiment.

For example, the embodiments of the present invention can be modified as illustrated FIG. 13 to FIG. 16 below. FIG. 13(a) to FIG. 13(d) are partially enlarged plan views of a circumferential recessed portion according to another embodiment. FIG. 14 is a sectional view along the tread width direction and the tire radial direction of a circumferential recessed portion 600 according to another embodiment. In FIG. 14, the right direction is the outer side in the tire radial direction and the left direction is the inner side in the tire radial direction. FIG. 15 is a partly enlarged plan view of a circumferential recessed portion 700 according to another embodiment. FIG. 16 is a partially enlarged perspective view of a circumferential recessed portion 800 according to another embodiment. FIG. 17 is a sectional view along the tread width direction and the tire radial direction of a circumferential recessed portion 900 according to another embodiment. FIG. 18 is a sectional view along the tread width direction and the tire radial direction of a circumferential recessed portion 1000 according to another embodiment.

Specifically, as illustrated in FIG. 13(a), first and second blocks formed in a circumferential recessed portion may not be formed in a straight line in the tire radial direction, but formed to be curved in the tire circumferential direction. Furthermore, as illustrated in FIGS. 13(b) to (d), the first block and the second block may be inclined in the tire circumferential direction. Furthermore, as illustrated in FIG. 13(e), lengths in the tire radial direction of the first block and the second block may be different from each other.

In the aforementioned embodiments and modification, the inner front end portion of the first block is perpendicular to the bottom surface of the circumferential recessed portion, and the outer front end portion of the second block is perpendicular to the bottom surface of the circumferential recessed portion. However, the present invention is not limited thereto. That is, in the aforementioned embodiments and modification, an angle formed by the inner front end portion of the first block and the bottom surface of the circumferential recessed portion is 90 degrees and an angle formed by the outer front end portion of the second block and the bottom surface of the circumferential recessed portion is 90 degrees. However, the angles may not be 90 degrees.

As illustrated in FIG. 14, in the section along the tread width direction and the tire radial direction, an inner front end portion 610a of a first block 610 may be inclined with respect to a bottom surface 603 of the circumferential recessed portion 600. An outer front end portion 620a of a second block 620 may be inclined with respect to the bottom surface 603. Another embodiment illustrated in FIG. 14, an angle α formed by the inner front end portion 610a of the first block 610 and the bottom surface 603 is an obtuse angle, and an angle δ formed by the outer front end portion 620a of the second block 620 and the bottom surface 603 is an obtuse angle. The length in the tire radial direction of the first block 610 is short as it goes toward the outer side in the tread width direction. The length in the tire radial direction of the second block 620 is short as it goes toward the outer side in the tread width direction.

When the angle α and the angle δ are equal to more than 90 degrees, the first block 610 and the second block 620 are difficult to be caught in a mold when the pneumatic tire is manufactured. Accordingly, when the pneumatic tire is manufactured, the pneumatic tire is easily detached from the mold. Accordingly, it is preferable that the angle α and the angle β are equal to more than 90 degrees. When the inner front end portion 610a and the outer front end portion 620a are inclined with respect to the bottom surface 603, the first block 610 and the second block 620 are further difficult to be caught in the mold. Accordingly, it is more preferable that the angle α formed by the inner front end portion 610a of the first block 610 and the bottom surface 603 is an obtuse angle and the angle β formed by the outer front end portion 620a of the second block 620 and the bottom surface 603 is an obtuse angle.

In the aforementioned embodiments and modification, the inner front end portion of the first block is positioned at the outer side in the tire radial direction from the center in the tire radial direction of the circumferential recessed portion, and the outer front end portion of the second block is positioned at the inner side in the tire radial direction from the center in the tire radial direction of the circumferential recessed portion. However, the present invention is not limited thereto. As illustrated in FIG. 15, an inner front end portion 710a of a first block 710 may be positioned at the inner side in the tire radial direction from the center in the tire radial direction of a circumferential recessed portion 700. That is, the first block 710 may extend with exceeding the center in the tire radial direction. An outer front end portion 720a of a second block 720 may be positioned at the outer side in the tire radial direction from the center in the tire radial direction of the circumferential recessed portion 700. That is, the second block 720 may extend with exceeding the center in the tire radial direction.

In addition, the center in the tire radial direction of the circumferential recessed portion is a midpoint of an average length in the tire radial direction between the intersection point between the outer surface of the tire side portion 20 and the first wall surface and the intersection point between the outer surface of the tire side portion 20 and the second wall surface. Thus, for example, even when the first wall surface and the second wall surface wind and extend in the tire circumferential direction, the center in the tire radial direction extends along the tire circumferential direction.

As illustrated in FIG. 15, the length in the tire radial direction of the first block 710 and the length in the tire radial direction of the second block 720 may be alternately changed. In this way, since the flow of the air flowing between the first block 710 and the second block 720 collides with the first block 710 or the second block 720, turbulence is further easily generated. As a consequence, it is possible to further suppress an increase in the temperature of the bead unit 30.

In the aforementioned embodiments and modification, the outer end portion in the radial direction of the first block is connected to the first wall surface, and the inner end portion in the radial direction of the second block is connected to the second wall surface. However, the present invention is not limited thereto. As illustrated in FIG. 16, the outer end portion in the radial direction of a first block 810 may be separated from a first wall surface 801. The inner end portion in the radial direction of a second block 820 may be separated from a second so wall surface 802. In the embodiment illustrated in FIG. 16, the outer end portion in the radial direction of the first block 810 does not make contact with the first wall surface 801. The inner end portion in the radial direction of the second block 820 does not make contact with the second wall surface 802. In this way, since the flow of the air is generated between the first block 810 and the first wall surface 801, turbulence is further easily generated. Since the flow of the air is generated between the second block 820 and the second wall surface 802, turbulence is further easily generated. As a consequence, it is possible to further suppress an increase in the temperature of the bead unit 30.

Furthermore, the angle formed by the outer surface of the tire side portion 20, and the first wall surface/the second wall surface may not be 90 degrees. Similarly, the angle formed by the bottom surface and the first wall surface/the second wall surface may not be 90 degrees. That is, the outer surface of the tire side portion, the first wall surface/the second wall surface, and the bottom surface may be connected to one another in a gentle curved shape. The third wall surface is also the same.

Specifically, as illustrated in FIG. 17, the outer surface of a tire side portion and a second wall surface 902 may be connected to each other in a curved shape. Furthermore, the second wall surface 902 and a bottom surface 903 may be connected to each other in a curved shape. The second wall surface 902 may be inclined with respect to the bottom surface 903. A first wall surface 901 is the same as the aforementioned embodiment. Furthermore, as illustrated in FIG. 18 the outer surface of a tire side portion and a second wall surface 1002 may be connected to each other in a curved shape, and the outer surface of the tire side portion and a first wall surface 1001 may be connected to each other in a curved shape. The first wall surface 1001 and a bottom surface 1003 may be connected to each other in a curved shape. The third wall surface is also the same.

In addition, for example, the first wall surface and the second wall surface may be connected to each other. That is, in the section along the tire radial direction and the tread width direction, the circumferential recessed portion may have a triangular shape. The boundary between the first wall surface and the second wall surface is the deepest portion of the circumferential recessed portion. In this case, the height H of the circumferential recessed portion is a height from the boundary between the first wall surface and the second wall surface to the outer surface of the tire side portion 20.

Furthermore, the widths W in the tie circumferential direction of the first block, the second block, and the third block or the heights in the tread width direction of the first block, the second block, and the third block may not be equal to one another. The width T in the tire circumferential direction of the fourth block, the width Y in the tire radial direction of the fifth block, and the heights in the tread width direction of the fourth block and the fifth block may not be equal to one another.

As the tire, it may be possible to use a pneumatic tire which is filled with air, nitrogen gas and the like, or a solid tire which is not filled with air, nitrogen gas and the like.

Respective characteristics of the aforementioned embodiments and modification can be combined with one another without departing the scope of the invention. In addition, in each embodiment and modification, a detailed description for the same configuration will be appropriately omitted.

As described above, it is of course that the present invention includes various embodiments and the like not described here. Therefore, the technical range of the present invention is to be defined only by the inventive specific matter according to the adequate claims from the above description.

In addition, the entire content of Japanese Patent Application No. 2010-176494 (filed on Aug. 5, 2010) is incorporated in the present specification by reference.

INDUSTRIAL APPLICABILITY

According to the present invention, it is possible to provide a tire that suppresses an increase in the temperature of rubber of a tire side portion, particularly, a bead unit while reducing the manufacturing cost.

The invention claimed is:

1. A tire comprising:
   a tire side portion; and
   a circumferential recessed portion formed at an outer surface of the tire side portion, the circumferential recessed portion being recessed inward in a tread width direction and extending in a tire circumferential direction, wherein
   the circumferential recessed portioned portion includes:
   a first block having a radial direction-outer end portion positioned at an outer side in a tire radial direction from a center in the tire radial direction in the circumferential recessed portion, and a radial direction-inner front end portion positioned at an inner side in the tire radial direction from the radial direction-outer end portion, the first block protruding outward in the tread width direction; and
   a second block having a radial direction-inner end portion positioned at the inner side in the tire radial direction from the center in the tire radial direction in the circumferential recessed portion, and a radial direction-outer front end portion positioned at the outer side in the tire radial direction from the radial direction-inner end portion, the second block protruding outward in the tread width direction,
   the radial direction-inner front end portion of the first block, and the radial direction-outer front end portion of the second block are separated in the tire circumferential direction or the tire radial direction, and
   the radial direction-outer end portion is formed, in a section along the tread width direction and the tire radial direction, at a position between a tire maximum width portion and an upper end portion of a rim flange.

2. The tire according to claim 1, wherein
   the first block protrudes inward in the tire radial direction from the tire radial direction-outer end portion in the circumferential recessed portion, and
   the second block protrudes outward in the tire radial direction from the tire radial direction-inner end portion in the circumferential recessed portion.

3. The tire according to claim 1, wherein
   the first block and the second block are formed in a straight line in the tire radial direction.

4. The tire according to claim 1, wherein
   the first block and the second block are formed to alternate in the tire circumferential direction.

5. The tire according to claim 1, wherein
   the circumferential recessed portion includes:
   a third block that is (i) separated from the radial direction-outer end portion and the radial direction-inner end portion in the tire radial direction, (ii) separated from the first block and the second block in the tire circumferential direction, and (iii) protrudes outward in the tread width direction from an inner side in the tread width direction of the circumferential recessed portion.

6. The tire according to claim 5, wherein
   the third block has:
   an outer end portion positioned at the outer side in the tire radial direction; and
   an inner end portion positioned at the inner side in the tire radial direction,
   the outer end portion is positioned at the outer side in the tire radial direction relative to the radial direction-inner front end portion of the first block, and
   the inner end portion is positioned at the inner side in the tire radial direction relative to the radial direction-outer front end portion of the second block.

7. The tire according to claim 1, wherein
   a depth in the tread width direction of the circumferential recessed portion is in a range of 10 mm to 25 mm.

8. The tire according to claim 1, wherein
   a length in the tire radial direction of the circumferential recessed portion is in a range of 100 mm to 150 mm.

9. The tire according to claim 6, wherein
   widths in the tire circumferential direction of the first block, the second block, and the third block are in a range of 2 mm to 10 mm.

10. The tire according to claim 1, wherein
    a distance along the tire radial direction between the radial direction-inner front end portion of the first block and the radial direction-outer front end portion of the second block is in a range of 15% to 30% with respect to a pitch in the tire circumferential direction of the first block and the second block.

11. The tire according to claim 1, wherein
    when a depth in the tread width direction of the circumferential recessed portion is defined as H, a pitch in the tire circumferential direction of the first and second blocks is defined as P, and widths in the tire circumferential direction of the first block and the second block are defined as W, a relation of $1.0 \leq P/H \leq 50.0$ and $1.0 \leq (P-W)/W \leq 100.0$ is satisfied.

12. The tire according to claim 1, wherein
    in a section along the tread width direction and the tire radial direction,
    the radial direction-inner front end portion of the first block is inclined with respect to a bottom surface of the circumferential recessed portion,
    an angle formed by the radial direction-inner front end portion of the first block and the bottom surface is an obtuse angle,
    the radial direction-outer front end portion of the second block is inclined with respect to the bottom surface, and
    an angle formed by the radial direction-outer front end portion of the second block and the bottom surface is an obtuse angle.

* * * * *